(12) United States Patent
Hiyama et al.

(10) Patent No.: US 6,608,657 B2
(45) Date of Patent: Aug. 19, 2003

(54) SWITCHABLE LIQUID CRYSTAL LIGHT GUIDE AND LIQUID CRYSTAL DISPLAY APPARATUS USING THE SAME

(75) Inventors: Ikuo Hiyama, Hitachi (JP); Tsunenori Yamamoto, Hitachi (JP); Makoto Tsumura, Hitachi (JP); Yoshinori Aono, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 99 days.

(21) Appl. No.: 09/832,591

(22) Filed: Apr. 10, 2001

(65) Prior Publication Data
US 2002/0033909 A1 Mar. 21, 2002

(30) Foreign Application Priority Data
Aug. 3, 2000 (JP) .......................... 2000-240364

(51) Int. Cl.[7] ............................................. G02F 1/1335
(52) U.S. Cl. ............................................. 349/62; 362/26
(58) Field of Search .................. 349/62, 74; 362/26, 362/318

(56) References Cited

U.S. PATENT DOCUMENTS 5,099,343 A * 3/1992 Margerum et al. ............ 349/63
6,414,728 B1 * 7/2002 Faris et al. ................... 349/10

* cited by examiner

Primary Examiner—Toan Ton
Assistant Examiner—Timothy L Rude
(74) Attorney, Agent, or Firm—Hogan & Hartson, LLP

(57) ABSTRACT

A light illumination apparatus comprising a light source on a lateral side of a light-pipe, and a reflector on the backside of the light-pipe, further comprising an air layer or the like between the light-pipe and the reflector, and, in order that light coming from a light source into the light-pipe is emitted from a light emission plane, the apparatus further comprising a light scattering control layer disposed at a portion of the light-pipe and having directivity in a direction substantially normal to the light emission plane, a means for substantially removing light scattering characteristics of a predetermined region of the light scattering control layer so as to satisfy the conditions for totally internal reflection of the incident light from the light source at an interface of the light-pipe, and a means for moving the predetermined region, wherein the time average amount of emitted light is substantially equal in each of all light emission regions, and there is time when the light emissive region substantially does not emit light; and a liquid crystal display apparatus using the same.

8 Claims, 16 Drawing Sheets

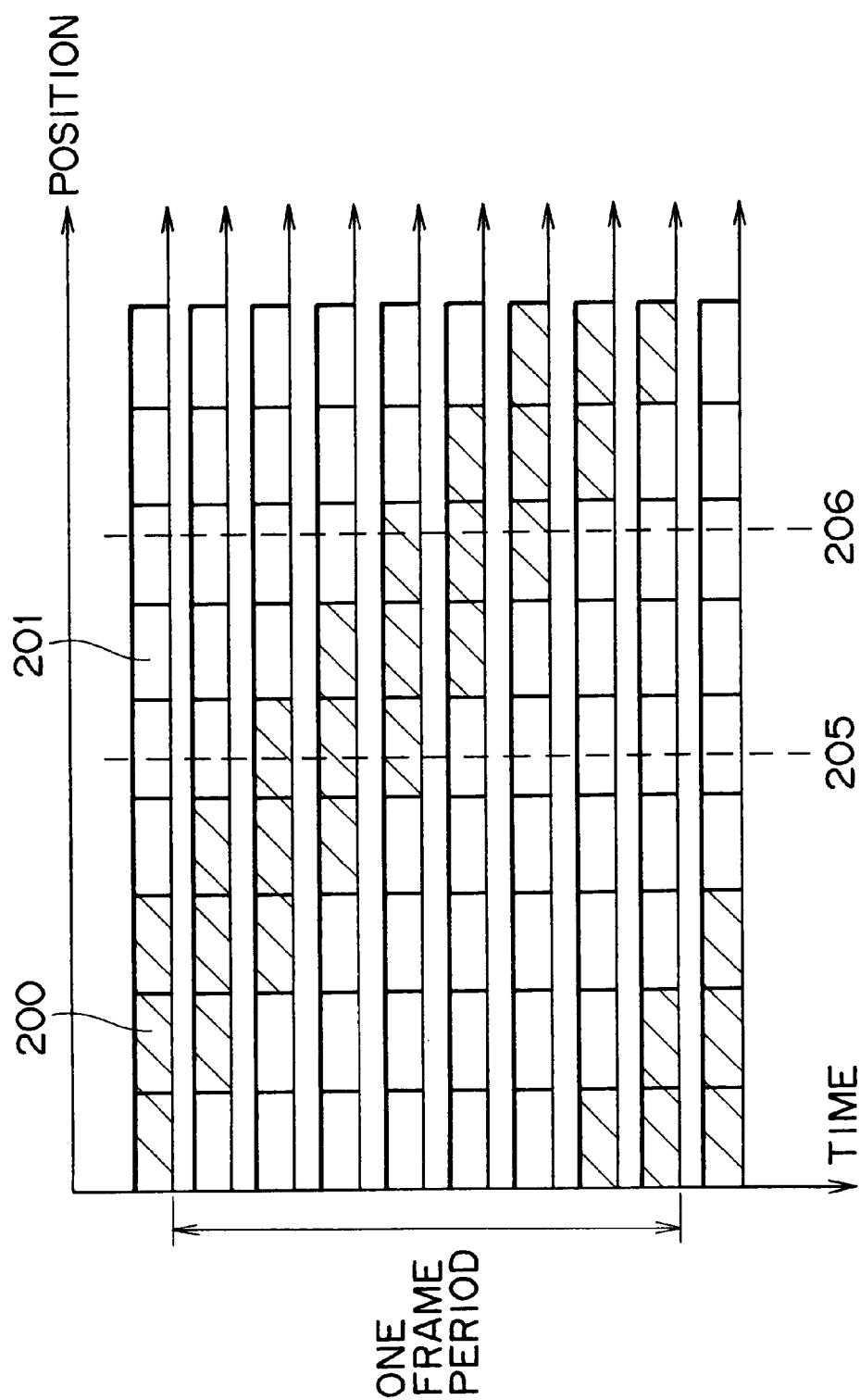

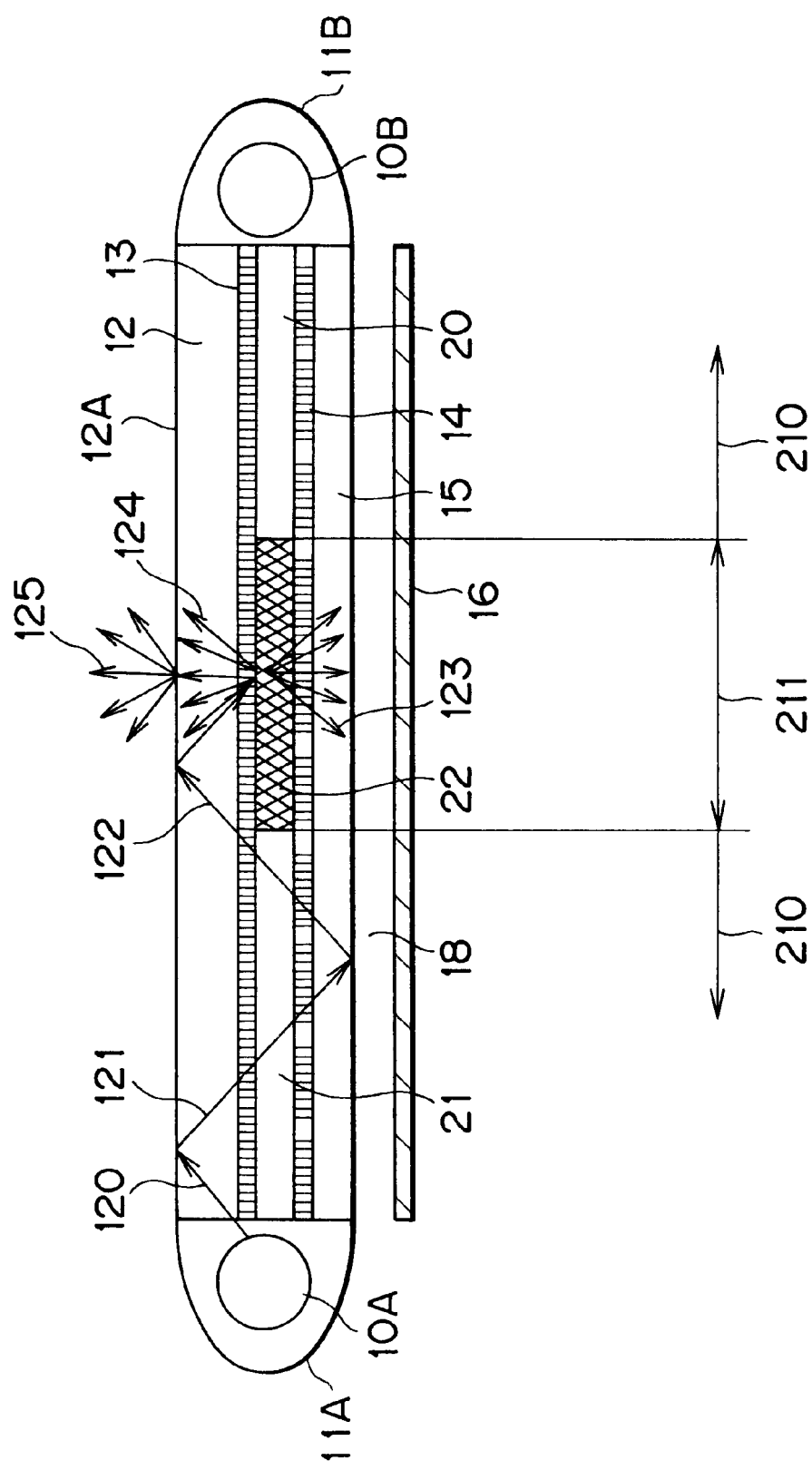

F I G. 7
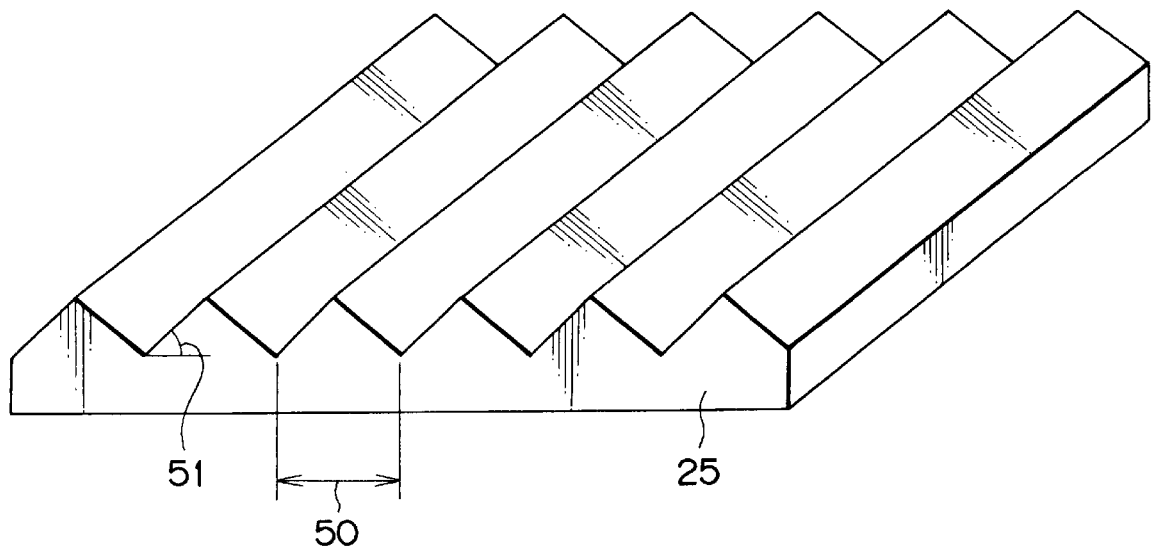

EXAMPLE (1/2 DUTY)

SWITCHABLE LIQUID CRYSTAL LIGHT GUIDE AND LIQUID CRYSTAL DISPLAY APPARATUS USING THE SAME

BACKGROUND OF THE INVENTION

1. Field of the Invention

The present invention relates to a light illumination apparatus and a liquid crystal display apparatus using the same.

2. Description of the Prior Art

Liquid crystal display devices having the merit of thinness and low electric power consumption have been applied in recent years to a display system mainly treating motion pictures, such as television receivers, and use thereof is being further enlarged.

Recently, however, there has reported the problem of deterioration of motion picture quality peculiar to hold type display devices represented by liquid crystal display devices (the Institute of Electronics, Information and Communication Engineers (IEICE) Technical Report SID96-4, pp.19–26 (1996-06)). The report also shows that a method of multiplying frame frequency by n, a method in which picture is displayed for $1/n$ of frame period and black is displayed for the remainder of the frame period, and the like are useful for solving the problem of deterioration of motion picture quality. The effectiveness of these methods for high-speed motion picture display is increased as the value of n increases.

In consideration of the above problem, technical developments corresponding to the quality of motion picture (hereinafter referred to as "motion picture quality") in liquid crystal display devices have been carried out. As a technology for improving motion picture quality by use of a light illumination apparatus, Japanese Patent Laid-Open No. Sho 64-82019 discloses a motion picture quality improving technology relating to blanking display in which a light-emitting portion of a backlight is blinked in accordance with picture driving scan.

Besides, apart from motion picture quality improving technology, a flat plate type light illumination apparatus providing illumination while changing the optical characteristics of predetermined regions of light-pipes in accordance with display, in order to enhance luminance, has been disclosed in Japanese Patent Laid-Open No. Hei 11-249580.

However, in the technology disclosed in the Japanese Patent Laid-Open No. Sho 64-82019, blanking can be controlled only by the unit of lamp diameter. Namely, blanking cannot be set with optimum timing for each scanning line, and there is still the problem that nonuniformity of luminance is generated between lamps. Although this problem can be solved by increasing the number of lamps, the lamps themselves actually have a diameter of not less than 1.8 mm and, therefore, it is impossible now to carry out blanking with the width on the order of pixels (about several tens of micrometers). Further, the number of lamps and the number of inverters for driving the lamps are extremely increased, which leads to a new problem of high cost.

On the other hand, the light illumination apparatus for illuminating predetermined regions as disclosed in the Japanese Patent Laid-Open No. Hei 11-249580 is useful in the point of concentrating the light incident on light-pipes, but still have problems yet to be solved in order to realize light utility efficiency and uniformity. In addition, the patent publication does not have any description about a driving method corresponding to display of motion picture, so there are still problems to be solved for realizing a light illumination apparatus adapted for motion pictures.

SUMMARY OF THE INVENTION

In view of the above situations, it is an object of the present invention to provide a light illumination apparatus with high light utility efficiency or uniformity and a liquid crystal display apparatus capable of displaying pictures with good motion picture quality using the light illumination apparatus.

In accordance with an aspect of the present invention, there is provided a light illumination apparatus comprising: a pair of light-pipes; and a liquid crystal layer sandwiched between the pair of light-pipes; the light illumination apparatus further comprising: a first transparent electrode divided into a plurality of regions disposed on the side of one of the pair of light-pipes faced to the liquid crystal layer; a second transparent electrode disposed on the side of the other light-pipe faced to the liquid crystal layer; a light source disposed on a lateral side of at least one of the pair of light-pipes; and a first reflector disposed on the side of either one of the pair of light-pipes opposite to the side faced to the liquid crystal layer, with an air layer therebetween; wherein the light-pipe attended by the light source has a refractive index of not less than $\sqrt{2}$, whereby totally internal reflection can be utilized and a light illumination apparatus with high light utility efficiency and low electric power consumption can be obtained.

In accordance with another aspect of the present invention, there is provided a liquid crystal display apparatus comprising: a liquid crystal display device comprising a pair of substrates, a first liquid crystal layer sandwiched between the pair of substrates, and a liquid crystal display device driving circuit for driving the liquid crystal layer; and a light illumination apparatus comprising a pair of light-pipes, a second liquid crystal layer sandwiched between the pair of light-pipes, and a backlight driving circuit for driving the liquid crystal layer, wherein driving mode of the first liquid crystal layer is normally open while driving mode of the second liquid crystal layer is normally transmissive, or driving mode of the first liquid crystal layer is normally closed while driving mode of the second liquid crystal layer is normally scattering, whereby the profile of brightness of light sensed by the observer can be made steep, and a liquid crystal display apparatus with high light utility efficiency and high contrast ratio can be obtained.

In accordance with a further aspect of the present invention, there is provided a liquid crystal display apparatus comprising: a liquid crystal display device comprising a plurality of pixels, and a driving circuit portion for controlling the display of the plurality of pixels; a light illumination apparatus; and a backlight driving circuit portion for controlling the light illumination apparatus, wherein the liquid crystal display device further comprises a liquid crystal display controller for controlling the driving circuit portion in the liquid crystal display device and the backlight driving circuit portion in the light illumination apparatus, in accordance with inputted picture data; the light illumination apparatus is a light illumination apparatus comprising the first transparent electrode in the form of stripes is composed of n transparent electrode stripes according to the present invention; and where the period of time for which the liquid crystal display controller performs display on the pixels in the liquid crystal display device is $1/k$ of one frame period, the number of the first transparent electrode stripes selected as scattering condition at a time is not more than $n/k$, and k is determined for every frame period, whereby the brightness of light sensed by the observer in one frame period can be made constant even in the case of so-called ⅓ fold speed driving, and a liquid crystal display apparatus having high light utility efficiency and adapted for display of motion picture with high quality can be obtained.

Besides, it is possible to provide a blink light illumination apparatus with high light utility efficiency. In addition, by use of the blink light illumination apparatus, an active matrix type liquid crystal display apparatus capable of obtaining good display characteristics even in the case of displaying motion pictures with high moving speeds can be provided.

The above and other objects, features and advantages of the present invention will become apparent from the following description and appended claims, taken in conjunction with the accompanying drawings which show by way of example some preferred embodiments of the invention.

BRIEF DESCRIPTION OF THE DRAWINGS

FIG. 2 is a diagram illustrating a control method of the light illumination apparatus of Embodiment 1;

FIG. 5 is a view illustrating the constitution of a light illumination apparatus of Embodiment 4;

FIG. 7 is a view illustrating an embodiment of rugged condition applied to a light illumination apparatus according to the 6th named invention;

DETAILED DESCRIPTION OF THE PREFERRED EMBODIMENTS

Figure 10:
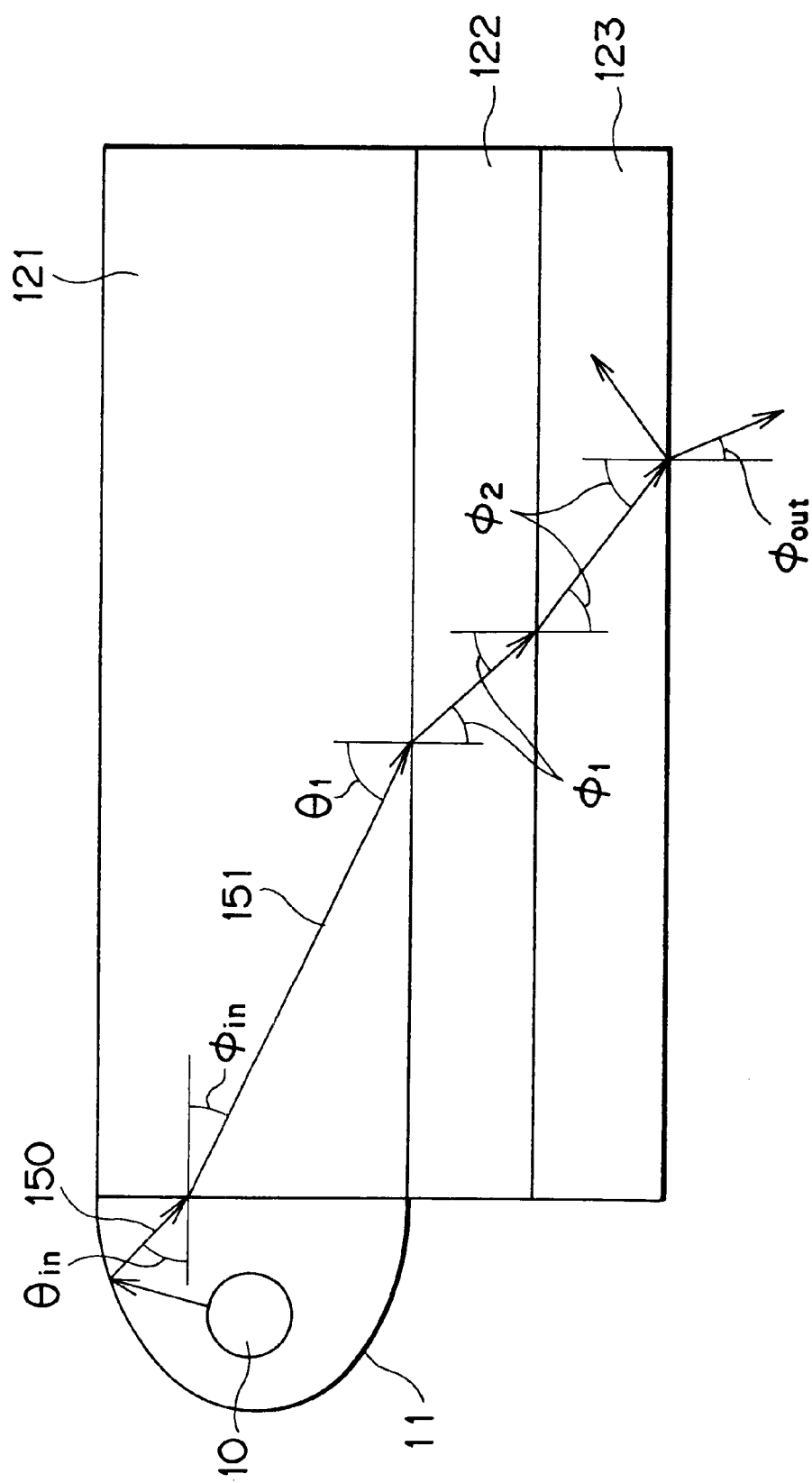
FIG. 10 is a diagram illustrating the principle utilized by the present invention.

First, the outline of a principle that the present invention utilizes will be briefly described referring to FIG. 10. The light illumination apparatus according to the invention utilizes the reflection of light at an interface of a light-pipe (totally internal reflection).

The light illumination apparatus of FIG. 10 comprises a light-pipe 121, a light source 10 disposed on a lateral side of the light-pipe 121 with an air layer therebetween, a light source cover 11, and light-transmissive media A 122 and B 123 provided beneath the light-pipe 121, and the medium B 123 is in contact with an air layer on the bottom surface thereof. The term "medium" used herein has a concept including the light-pipe.

The light 150 emitted from the light source (hereinafter referred to as "emitted light") is incident on the light-pipe 121 at an angle of incidence $\theta_{in}$ (the angle made between the normal to the light-incident surface and the incident light; the same applies to $\phi_{in}$, $\theta_{in}$ and the like described later), and is refracted at an angle of refraction $\phi_{in}$ n and is propagated through the light-pipe. The angle of refraction $\phi_{in}$ n is given by Eq. 1 according to the Snell's law.

$$\phi_{in} = \sin^{-1}\left(\frac{n_{air1}}{n_{med}}\sin\theta_{in}\right) \quad \text{Eq. 1}$$

The refractive index of air is nair1, and the refractive index of the light-pipe 121 is isotropically $n_{med}$.

The incident light 151 is propagated through the light-pipe 121 and reaches the plane surface (interface) of the light-pipe at an angle $\theta_1$ (the angle made between the normal to the plane surface of the light-pipe 121 and the incident light). In this case, $\theta_1$ is given by the following equation:

$$\theta_1=(90-\phi_{in}) \quad \text{Eq. 2}$$

Refraction similar to the above occurs also at the interfaces between the light-pipe 121 and the medium A 122, between the medium A 122 and the medium B 123, and between the medium B 123 and air, and the following relationships are obtained:

Interface between light-pipe and medium A:

$$n_{med} \sin \theta_1 = n_1 \sin \phi_1 \quad \text{Eq. 3}$$

Interface between medium A and medium B:

$$n_1 \sin \phi_1 = n_2 \sin \phi_2 \quad \text{Eq. 4}$$

Interface between medium B and air layer:

$$n_2 \sin \phi_2 = n_{air2} \sin \phi_{out} \quad \text{Eq. 5}$$

$$\sqrt{n_{med}^2 - n_{air1}^2\sin^2\theta_{in}} = n_{air2}^2\sin\phi_{out} \quad \text{Eq. 6}$$

where $n_a$ is the refractive index of the medium A, $n_b$ is the refractive index of the medium B, $n_{air2}$ is the refractive index of air on the side on which light comes out of the medium, $\phi_1$ is the angle of refraction when light comes from the light-pipe into the medium A and the angle of incidence when light comes from the medium A into the medium B, $\phi_2$ is the angle of refraction when light comes from the medium A into the medium B and the angle of incidence when light comes from the medium B into the air layer, $\phi_{out}$ is the angle of refraction (angle of emission) when light comes from the medium B into the air layer. By use of the relationships of Eq. 1 to Eq. 5, the relation of Eq. 6 can be obtained.

The relationship of Eq. 6 means independence from the angles of incidence, angles of refraction and refractive indices of the medium A and the medium B. Namely, the light incident from the air layer is propagated through a plurality of light-pipes and media, but the passage of it is independent from the refractive indices of the media.

Further, putting $n_{air1}=n_{air2}=1$ into Eq. 6, computation is carried out in consideration of the condition for satisfying totally internal reflection irrespective of the angle of incidence on the light-pipe (maximum $\theta_{in}=90°$) and the condition for satisfying the totally internal reflection ($\phi_{out} \geq 90°$), to obtain the following relationship:

$$n_{med} \geq \sqrt{2} \qquad \text{Eq. 7}$$

This means that, when light is made to come from the air layer into the light-pipe so as to satisfy the conditions for totally internal reflection in consideration of the refractive index of the air layer and the refractive index of the light-pipe, the light necessarily undergoes totally internal reflection at the interface of the air layer, irrespectively of the refractive index of the medium through which the light is propagated.

Eq. 7 means that if only $n_{med}$ is not less than $\sqrt{2}$, the light propagated through the medium always undergoes totally internal reflection at the interface between the medium and the air layer, independently from the medium. While the air layer is used in the present invention, other material layers may be used as far as the material layer has a low refractive index similar to that of the air layer. Where the constitution shown in FIG. 10 is applied to an actual light illumination apparatus, examples of component elements of the media A and B include light-pipes, liquid crystal layers, transparent electrodes, oriented films, a liquid crystal layer sandwiched between a pair of films, and the like. These are only examples; the medium on which the light from the light source is incident (light-pipe 12 in FIG. 1) is not limited to the light-pipe, and the number of the media is not limited to 2. This is because one important point of the present invention is that incidence of light on a medium is so controlled as to satisfy the conditions for totally internal reflection in consideration of the refractive index of the medium from which light is coming and the refractive index of the medium on which the light is incident. Where an acrylic resin plate having a refractive index of 1.49 is used as the light-pipe in FIG. 10, the maximum value of $\phi_{in}$ is about 42°, and the minimum value of angle of reflection $\phi_2$ is about 48°.

As will be described in the embodiments below, application of the invention to an actual light illumination apparatus may be accompanied by problems arising from birefringence of the liquid crystal layer and new problems arising from a rugged interface provided for high light directivity, and the methods of solving such problems will also be described later.

In summary, the present invention on principle uses totally internal reflection and, in order to realize actual application to a light illumination apparatus, solves the problems relating to refractive index of liquid crystal and refractive index attendant on concentration of light.

Besides, specific arrangements of a light illumination apparatus and an emission method adapted for motion pictures will be described in the embodiments below. The same symbols used in Figures denote the same or similar members.

Embodiment 1

Now, a light illumination apparatus according to Embodiment 1 will be described using the above-mentioned principle and FIG. 1.

Figure 1A:
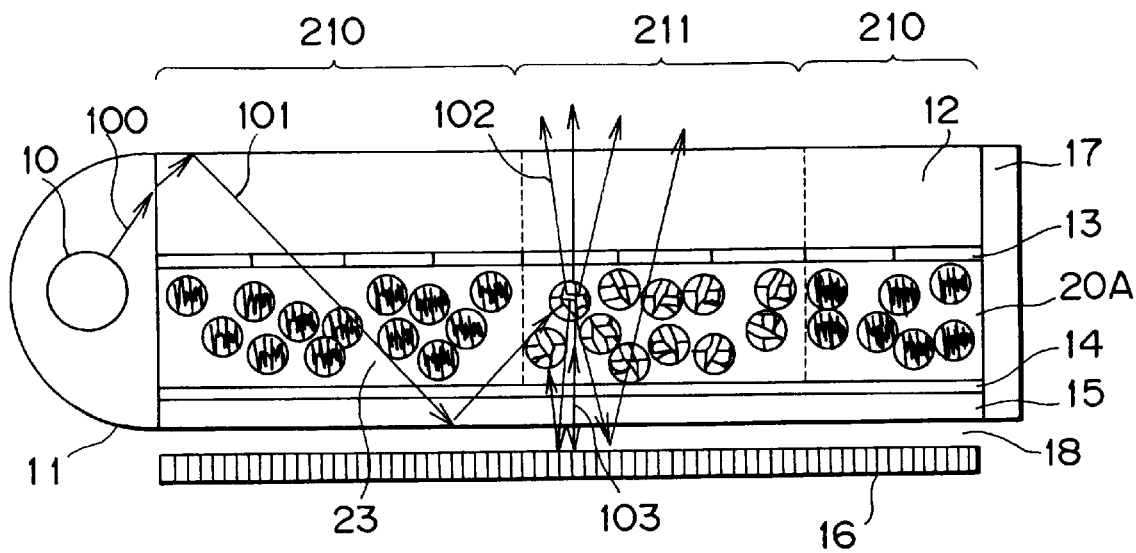
FIG. 1 illustrates the constitution of a light illumination apparatus of Embodiment 1.
Figure 1B:
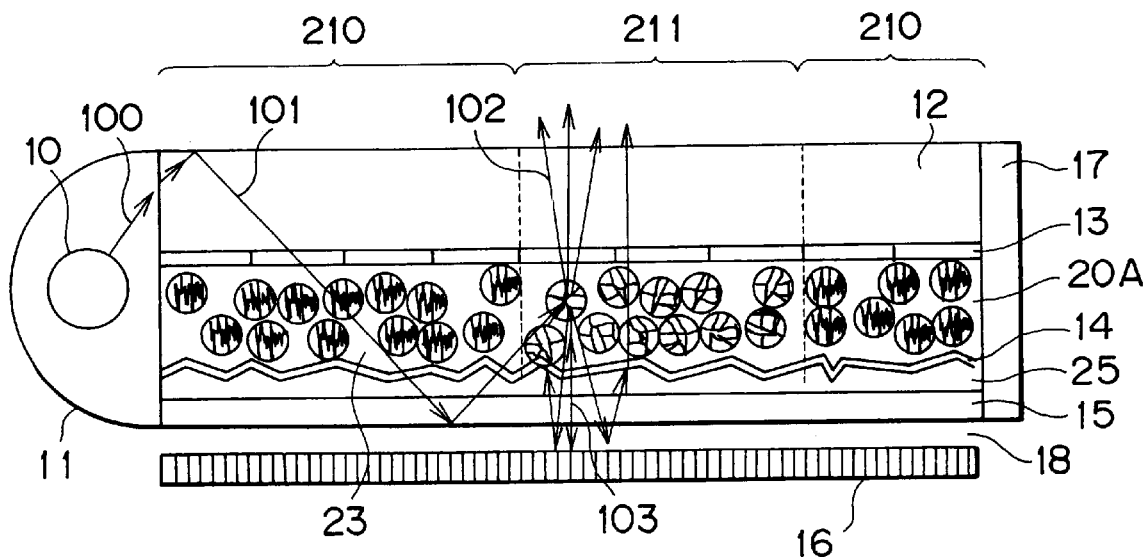

FIG. 1A and FIG. 1B are sectional views of light illumination apparatuses according to Embodiment 1. As will be described later, the structural difference between the light illumination apparatuses of FIG. 1A and FIG. 1B is the presence or absence of a rugged pattern 25 provided on one of light-pipes.

First, FIG. 1A will be explained. The light illumination apparatus shown in FIG. 1A comprises a pair of light-pipes 12, 15 made of acrylic resin, transparent electrodes 13, 14 one of which is provided in the form of stripes, a polymer dispersed liquid crystal (PDLC) layer 20A sandwiched between the pair of light-pipes, an air layer provided on the lower side of the pair of light-pipes, a first reflector 16 provided on the lower side of the light-pipe with an air layer therebetween, a cold cathode fluorescent tube 10 (hereinafter referred to as "light source") as a light source disposed on a lateral side of the pair of light-pipes, a light source cover 11 covering the light source, and a second reflector 17 disposed on the other lateral side. The term "stripe" herein means an arrangement of lines having a predetermined width, which includes tetragons and non-straight lines. In FIG. 1A, the light source 10 has a tube diameter of 2.6 mm and a length (orthogonal to the surface of paper) of about 290 mm. The size of the pair of light-pipes 12, 15 is 290 mm×225 mm, and thickness of the light illumination apparatus including the pair of light-pipes (the total thickness of the light pipes 12, 15) is 3.5 mm. The liquid crystal layer is a PDLC layer comprising nematic liquid crystal droplets with an average diameter of about 1 $\mu$m dispersed in an organic medium having a thickness of 12 $\mu$m and a refractive index of 1.49. The liquid crystal layer has a normal direction refractive index $n_0$ under an applied electric field of 1.49 and a birefringence $\Delta n$ of 0.2. The light-pipes are made of an acrylic resin having a refractive index of 1.49. Since the refractive index of the transparent electrodes (ITO) is about 2.0, the thickness thereof was set to be about 65 nm, sufficiently smaller than visible ray wavelength, in order to secure the function as transparent electrode and minimize optical influences and light absorption. Therefore, the transparent electrodes 13, 14 are substantially negligible on an optical basis. The specific component materials are not limited to those in Embodiment 1, as far as the effects or actions described in this embodiment are displayed.

Next, detailed principle of scattering/transmission of light and effects thereof will be described in detail.

In Embodiment 1, for example, the transmissive condition 210 is realized by application of electric field (30 V is applied in Embodiment 1), while the scattering condition 211 is realized by non-application of voltage (0 V in Embodiment 1). For explanation, the ratio of the thicknesses of the light-pipe 12 and the liquid crystal layer is differed from the actual ratio. While the thickness of the liquid crystal layer 20A in the light illumination apparatus according to Embodiment 1 is actually 12 $\mu$m, the thickness of the light-pipe 12 is about 3.5 mm; therefore, the light incident on the light-pipe is considered to be entirely incident on the light-pipe. The refractive index of the light-pipe 12 is not less than $\sqrt{2}$, so that the incidence of light on the light-pipe satisfies the conditions for totally internal reflection at the interface of the lower light-pipe and air.

In the transmissive condition 210 which is a voltage applied condition, the liquid crystal molecules are uniformly oriented in accordance with the electric field. Therefore, in this region, the surrounding organic medium and the PDLC are optically equivalent; thus, the PDLC layer 20A as a whole is equivalent to the presence of an isotropic medium with a different refractive index sandwiched between the pair of light-pipes 12, 15, and this can be taken as the same as the condition shown in FIG. 10. Accordingly, if the incident light 100 satisfies the conditions for totally internal reflection at the time of incidence on the light-pipe 12, the incident light 100 coming into the transmissive condition 210 is propagated through the light-pipe 15 without scattering, and undergoes totally internal reflection at the interface of the lower light-pipe 15 (the lower side in FIG. 1), to be reflected light 101. Therefore, the reflected light 101 undergoes totally internal reflection repeatedly while being propagated through the light-pipe. If the PDLC 20A as a light scattering control layer in the light illumination apparatus is entirely in a field-applied condition, the incident light undergoes totally internal reflection repeatedly at the interface, and, ideally, will not come out of the light-pipe, so that the light-pipe appears dark as viewed from the upper side of the apparatus. This condition (region) of the light illumination apparatus will be expressed herein as a field-applied condition (region) or a light non-emission condition (region). The condition (region) of the liquid crystal layer corresponding to this condition (region) will be expressed as a transparent condition (region).

On the other hand, when light is incident on the scattering condition 211 in which the light scattering control layer 20A is in a voltage non-applied condition, the light is scattered to be scattered light 102, 103 because the liquid crystal molecules in the liquid crystal droplets are oriented at random. The angle of incidence of the scattered light 102 (upward scattered light in FIG. 1) at the interface of the light-pipe is smaller than that for totally internal reflection, so that the light is emitted from the light-pipe 12. Also, the angle of incidence of the scattered light 103 (downward scattered light in FIG. 1) at the interface of the light-pipe is smaller than that for totally internal reflection, so that the light is emitted downward from the light-pipe, then reflected by the reflector 16 at a lower portion of the light illumination apparatus, is again incident on the apparatus and the like, to be finally emitted upward from the light-pipe. Therefore, in this condition, light is emitted from the portions in the field non-applied condition of the light illumination apparatus, and stripes of light corresponding to the field non-applied regions can be seen from above the apparatus. This condition of the light illumination apparatus will be expressed herein as a field non-applied condition (region) or a light emission condition (region), and the condition (region) of the liquid crystal layer corresponding to this condition (region) will be expressed as a scattering condition (region).

The reflector 16 at a lower portion of the light illumination apparatus used in this embodiment is provided primarily for reflecting the scattered light 103 to the upper side of the apparatus, and an air layer is provided between the reflector 16 and the pair of light-pipes. This arrangement arises from the fact that the light illumination apparatus according to the present invention utilizes totally internal reflection. The effects of the arrangement of the first reflector and the air layer will now be described.

Provision of a metallic reflector directly on the lower side of the pair of light-pipes is effective for entirely directing the reflected light to the upper side and uniformizing the reflected light. However, where thinness, high light utility efficiency, concentration or localization of light and the like are of importance as in the case of this embodiment, light absorption by metal or the like is not negligible but significant. This will be described referring to FIG. 1A according to Embodiment 1.

As described above, the depth of the light-pipe on the side faced to the light source is 225 mm, and the thickness of the pair of light-pipes is 3.5 mm. If light is incident on the light-pipe at an angle of refraction $\phi_{in}$ and undergoes totally internal reflection repeatedly, the number N of times the incident light is reflected at the lower interface until it reaches the second reflector 17 is roughly given by the following equation.

$$N = \frac{225}{2 \times 3.5} \tan\phi_{in} \qquad \text{Eq. 8}$$

In contrast, the case where a metallic reflector is directly disposed at the interface of reflector is contemplated. When the reflectance of the metallic reflector is R, the ratio of the intensity $I_0$ of light incident on one lateral side of the light-pipe and the intensity I of light reaching the other lateral side is given by the following equation.

$$\frac{I}{I_0} = R^N \qquad \text{Eq. 9}$$

When, for example, $\phi_{in}$=43° and R=0.93 for a value of aluminum or silver, a generally used reflector, are put into the equations, $I/I_0$ is calculated to be about 11%, which means a significant loss of light quantity. This also means that light utility efficiency is decreased as the thickness of the pair of light-pipes is decreased in comparison with the depth thereof. According to the present invention, therefore, the metallic plate is provided on the lower side of the light-pipe with an air layer therebetween, primarily for directing the scattered light to the upper side, and the air layer is provided between the reflector and the pair of light-pipes so as to satisfy the conditions for totally internal reflection at the interface with the light-pipe, whereby light utility efficiency can be enhanced as much as possible.

By the arrangement of FIG. 1A, the light illumination apparatus according to the present invention produces a transmissive condition and a scattering condition by arbitrarily controlling the electric field applied to the PDLC (controlling the reflection conditions in the light-pipe), and can efficiently emit light from the portions in the scattering condition. From another point of view, if the transmissive condition and the scattering condition are selected and the transmissive portions are restricted, the light from a single light source is substantially entirely scattered and emitted through the selected portions by use of totally internal reflection, so that the sum of quantities of light emitted per unit time from the light illumination apparatus as a whole can be constant.

Besides, the light source is not limited to the cold cathode fluorescent tube, and may be other light-emitting element such as an organic LED array, as long as it can input light to the light-pipe while satisfying the conditions for totally internal reflection.

Next, FIG. 1B will be described.

FIG. 1B shows a rugged pattern 25 such as a prism sheet as, for example, a diffuser or a light path converting element provided on the light-pipe 12 for correcting directivity of the emitted light 102, and a transparent electrode 14 is disposed on the rugged pattern. Arrangements of other components are substantially the same as FIG. 1A, and the rugged pattern of FIG. 1B is made of an acrylic resin, the same material as the light-pipe 15. However, the material is not limited to that in this embodiment, as long as the same effect is obtained through refractive index. Detailed shape of the rugged pattern 25 will be described later in other embodiment.

The PDLC layer 20A used in the Embodiment 1 has a substantially isotropic scattering property, and much light undergoes totally internal reflection at the light emissive interface. Namely, even if a light scattering property exists as mentioned above, if the light is not directed to the normal to the light emissive plane, the light components with an angle of incidence on the interface of greater than $\sin^{-1}(1/n_{med})$ may undergo totally internal reflection and may not be emitted. Therefore, the rugged pattern 25 other than the PDLC layer of the scattering control layer 20A is disposed, and the scattered light is directed to the normal to the interface, whereby emission efficiency can be enhanced and the light illumination apparatus can be made further useful. However, since the rugged pattern 25 is not parallel with the reflection plane (the interface between the air layer and the light-pipe in Embodiment 1), there is a new problem that reflections not satisfying the conditions for totally internal reflection will occur even under the transmissive condition. Thus, matching the refractive indices of the rugged pattern 25 and the liquid crystal layer is particularly useful for maintaining the conditions for totally internal reflection. As described above, the light 110 incidents on the light-pipe 12 passes through the light-pipe 12 and the PDLC layer, undergoes totally internal reflection at the interface of the light-pipe 15, and is propagated through the light illumination apparatus. In order to repeat totally internal reflection under the transmissive condition, it is necessary that the interfaces in between different media present in the apparatus be parallel to the totally internal reflection interface (the interface between the air layer and the light-pipe) or the refractive indices on both sides of a non-parallel interface be equal. In the case of FIG. 1B comprising the rugged pattern 25, the latter arrangement is partially adopted to solve the problem. Namely, all the refractive indices of the light-pipe 15, the rugged pattern 25 and the organic medium surrounding the liquid crystal droplets 24 in FIG. 1B are substantially isotropically 1.49.

Namely, in the field-applied condition (light non-emission condition), the refractive index of the liquid crystal droplets, the refractive index of the organic medium surrounding the liquid crystal droplets 24 and the refractive index of the rugged pattern 25 are substantially equal, so that light undergoes totally internal reflection repeatedly while being propagated through the light illumination apparatus. In the field non-applied condition (light emission condition), on the other hand, the liquid crystal droplets 24 in contact with the interface of the rugged pattern 25 form a scattering interface corresponding to the rugged pattern 25, to induce scattering with enhanced directivity. The directivity can be further enhanced by providing the distance on the order of wavelength with periodic property.

In the light illumination apparatus of the present invention, further, the relationship between light intensity and the scan of light emissive regions is studied, thereby contriving an increase in design tolerance, coping with motion pictures and the like. First, light intensity will be described.

The widths of transparent electrodes in this embodiment are equal, and an arbitrary light intensity can be obtained by regulating emission area through controlling the application of voltage. Concretely, for example, in a light illumination apparatus with n stripes of transparent electrode, the intensity of light in the case where only the region formed by one transparent electrode is in the scattering condition is n times of the intensity of light in the case where all regions formed by n transparent electrodes are in the light emissive condition (scattering condition). Namely, when the area of the light emissive region is reduced to 1/n, a light intensity increased to n fold can be obtained. The term "stripes" herein includes the condition where transparent electrodes with a predetermined width are arranged without gaps therebetween.

This is because the quantity of light emitted from the light source is substantially constant and absorption of light is substantially absent (utilization of totally internal reflection). More specifically, the intensity of light in the case where one half of the total area is turned ON (½ of total area is in light emissive condition) can be two times that in the case where the total area is turned ON (total area is in the light emissive condition).

Naturally, the term "n times" ideally used herein for explanation is not strictly n times, but refers to the range including some loss of light.

Next, an outline of the light emission method, that is, scan of light emissive regions, using the light illumination apparatus according to Embodiment 1 will be described referring to FIG. 2.

This method is characterized in that the scattering condition (or transmissive condition) described in FIG. 1 is sequentially moved line by line (or stripe by stripe), and a specific example is illustrated in FIG. 2 which shows the relationships of position, time and amount of light emitted in a light-pipe.

The axis of abscissas in FIG. 2 represents the position in the light-pipe in a direction perpendicular to the axis of a light source 10 (roughly the propagation direction of light in FIG. 1), and the axis of ordinates represents time. Any position in the light-pipe is in either a light emission region 200 (voltage non-applied condition) or a light non-emission region 201 (voltage applied condition), and FIG. 2 represents that the light emission region 200 moves rightwards (in a direction away from the light source) as time passes.

Though omitted in Embodiment 1, the present light illumination apparatus comprises a backlight driving circuit as a voltage applying mechanism capable of controlling the scattering and transmission of the PDLC constituting a light scattering control layer 20A by applying a voltage to the transparent electrodes 13, 14. These will be detailed later.

Now, the effects of this emission method will be described.

It is known that a human being recognizes the time average of light quantity in an arbitrary region as the brightness of the region. For example, in the case of a display apparatus displaying pictures or the like periodically, the general period (frequency) is about 60 Hz (16.7 ms), and the human being looking at an arbitrary region on the display apparatus recognizes the average of the periodic light quantity as the brightness of the region.

Description will be made of FIG. 2 which shows a concrete example. In the light illumination apparatus of FIG. 2, one period (one frame period) is divided into nine subframe periods, and the region of the transparent electrode (light emission region or light non-emission region) is divided into nine stripe regions. According to the light emission method of the light illumination apparatus of FIG. 2, three stripe regions are selected as regions of emitting light in one subframe period, and the selected regions are moved rightwards in the figure by one stripe region at a time at each subframe. Therefore, the area of the light emission region in an arbitrary subframe is ⅓ of the total area of all regions, and, correspondingly, the intensity of light in each stripe region is about 3 fold. As a result, each stripe region is selected for three subframe periods in each period (⅓ period), and the brightness to the human eyes is the same with that in the case where all regions are in light emission conditions (⅓ period×3 fold light intensity=one period×one light intensity) This means that, where m stripe regions are provided, when each stripe region is made to be a light emission region for m subframe periods in one period, the light illumination apparatus always has a constant brightness. In addition, the number of the stripe regions can be determined according to design requirements at the time of producing the light illumination apparatus.

Namely, in FIG. 2, in the portion surrounded by broken lines 205 and 206, the value of light quantity per period (corresponding to the area of the shaded parts) is sensed as brightness by the observer. Where the distance between the lines 205 and 206 is constant, time average brightness is constant irrespective of where the surrounded region is moved (which regions are selected). Further, if the distance between the lines 205 and 206 is constant, the brightness is constant irrespectively of the magnitude of the distance. This means that if only the area of the regions is constant, the brightness of the regions is independent from the position of the regions in the light illumination apparatus.

From another point of view, even though light illumination regions and light non-emission regions are present at a moment, by the scan of the regions, the observer's eyes sense the time average and recognize that the light illumination apparatus as a whole emits a constantly uniform quantity of light. Herein the light illumination method by selecting predetermined regions and scanning the selected regions is referred to as a blanking method.

As shown in FIG. 2, as far as the system of moving the light emission regions 200 is adopted, the lamp can be always turned ON; therefore, it is unnecessary to increase the number of inverters, there is no need for high-speed control of inverters with high voltage output, and a reduction in power consumption can be contrived. In addition, it is unnecessary to increase the number of lamps disposed on a lateral side of the light-pipe, the light emission regions can be designed freely, the width of the light emission region can be made smaller than the lamp diameter, and design tolerance can be enlarged.

This also means that the number of light emission regions in a subframe period can be changed over by a driving circuit. Namely, in FIG. 2 the number of light emission regions selected in a subframe period is three, but it can be made to be one. Naturally, in this case also the brightness of the light illumination apparatus as a whole sensed by the observer's eyes is theoretically unchanged. This is a particularly effective technique for adaptation to motion pictures, and further effects of combining this with a liquid crystal display apparatus will be described in later embodiments.

While in Embodiment 1 the light emission regions are moved away from the light source, the scanning direction is not limited to this direction. For example, movement of the light emission regions toward the light source can be realized, and the axis of the light source can be perpendicular to the moving direction of the light emission regions. Other arrangements can also be contemplated, as far as the points described herein are utilized.

Embodiment 2

Figure 3:
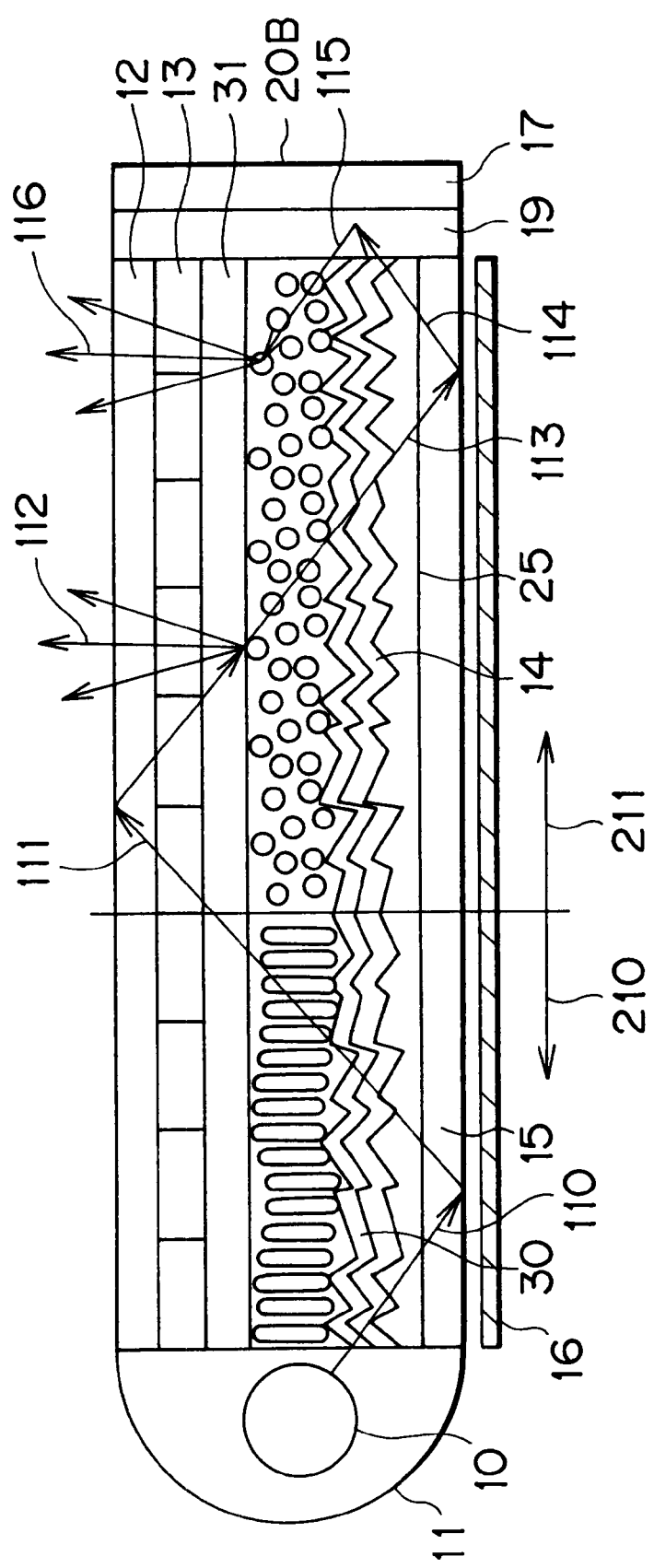
FIG. 3 is a view illustrating the constitution of a light illumination apparatus of Embodiment 2.

A sectional view of a light illumination apparatus according to Embodiment 2 is shown in FIG. 3.

FIG. 3 differs from the light illumination apparatus of FIG. 1B in that a nematic liquid crystal layer is used in place of the PDLC and that a phase difference plate 19 functioning as a ¼ wavelength plate is disposed on the inside of the reflector 17. Differences attendant on the just-mentioned differences include oriented films 30, 31 formed on transparent electrodes 13, 14 for orienting the nematic liquid crystal, a rubbing treatment for setting the orientation vector in the initial condition parallel to the axial direction of the light source 10 and the like.

The nematic liquid crystal used in Embodiment 2 has a thickness of liquid crystal layer of about 10 $\mu$m, a normal direction refractive index $n_0$ of 1.49, and a birefringence $\Delta n$ of 0.2, and dielectric constant anisotropy and birefringence are positive. The light-pipes 12, 15 were made of an acrylic resin with a refractive index of 1.49. The transparent electrodes 13, 14 are made of ITO, the same as in Embodiment 1, and the thickness thereof is about 65 nm, sufficiently smaller than visible wavelength, in order to minimize optical influence and light absorption.

Now, effects of the constitution of Embodiment 2 will be described.

Incidentally, the condition (region) where an electric field is applied to a polarized light scattering control layer 20B is expressed as transmissive condition (region), and the condition (region) where the field is not applied is expressed as scattering condition (region). The incident light is considered dividedly as P polarized light component and S polarized light component. The P polarized light component is parallel with the plane of incidence, while the S polarized light component is perpendicular to the plane of incidence. The plane of incidence is a plane containing the propagating direction of light and the normal to the boundary plane (a plane surface of the light-pipe 12 in FIG. 3).

First, the transmissive condition will be described.

In the transmissive condition 210 corresponding to the transmissive (voltage applied) condition of the polarized light scattering control layer 20B, the orientation vectors of liquid crystal are uniformly oriented along the electric field generated by application of a voltage between the transparent electrodes.

In the transmissive condition, the refractive indices of the liquid crystal layer and the rugged pattern 25 for S polarized light component are equally 1.49 and, therefore, the incident light 151 does not undergo refraction or scattering by the rugged pattern. Accordingly, the incident light 151 is propagated through the light illumination apparatus while repeating totally internal reflection. The same can be considered with the P polarized light component. Although the refractive indices of the liquid crystal layer and the rugged pattern 25 for the P polarized light are somewhat different, they are designed ($\Delta n$=0.2 in Embodiment 2) substantially not to affect the conditions for totally internal reflection in consideration of angular distribution of light in the light-pipe 15 and dependent refractive index sensed by P polarized light component (a section of refractive index ellipsoid), so that the light of the P polarized light component also repeats totally internal reflection at the interface with the air layer of the light illumination apparatus, and is propagated until it is incident on the scattering condition 211 of the voltage non-applied condition. In this meaning, the rugged pattern 25 is functionally absent.

Next, the scattering region will be described.

In the scattering regions, orientation vectors of liquid crystal are directed orthogonal to the surface of drawing. Therefore, refractive indices of the liquid crystal layer and the light-pipe for the S polarized light component are always different, independently of the angle of incidence. Thus, in the scattering regions, the S polarized light component with no polarization is influenced by the difference between the refractive indices of the liquid crystal layer and the rugged pattern 25, and the incident light 151 undergoes refraction and scattering to become emitted S polarized light 112. On the other hand, since the refractive indices of the liquid crystal layer and the light-pipe for the P polarized light component are equal, the P polarized light rarely undergoes refraction and scattering, and is propagated through the light illumination apparatus while repeating totally internal reflection at the interface of the light-pipes 15, 12. However, the P polarized light reaching the lateral side opposite to the lateral side on which the light source is disposed is polarizationally converted by the phase difference plate 19 functioning as a ¼ wavelength plate and the second reflector, to be reflected S polarized light. The converted S polarized light 115 is again propagated to reach the scattering region, where it undergoes refraction and scattering, to become emitted S polarized light 116.

Thus, since non-polarized light can be polarizationally converted and light can be emitted from selective positions, application of the system to a display device utilizing polarized light can provide a particularly enhanced light utility efficiency. Naturally, this enables concentration of light to a predetermined region and regulation of light intensity. In another aspect of the invention, it may be expressed that the rugged pattern is made to appear only in predetermined regions and that light is concentratedly emitted.

In Embodiment 2, in the same manner as FIG. 2 of Embodiment 1, movement of the light emission region 200 can be realized without increasing the number of lamps, and scanning of the light emission region can be carried out while keeping the lamp ON. Further, as compared with the case where all regions are turned ON, when a certain region is turned ON for ⅓ period, the brightness must be multiplied by 3 in order to obtain the same sensation of brightness. In Embodiment 2, light is emitted concentratedly from the light emission region 200 and the brightness of the ON region is increased to 3 fold, so that the time average brightness can be the same as that in the case where all regions are ON.

Embodiment 3

Figure 4A:
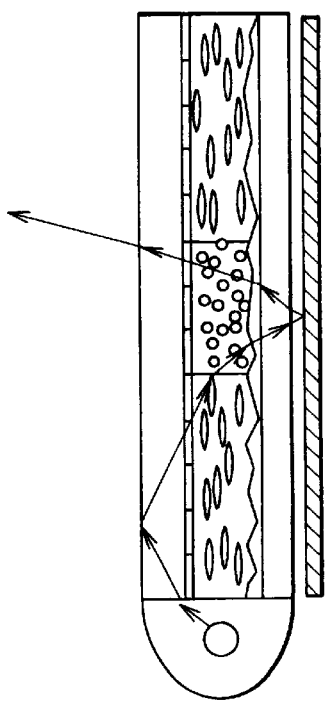
FIG. 4 illustrates the constitution of a light illumination apparatus of Embodiment 3.
Figure 4B:
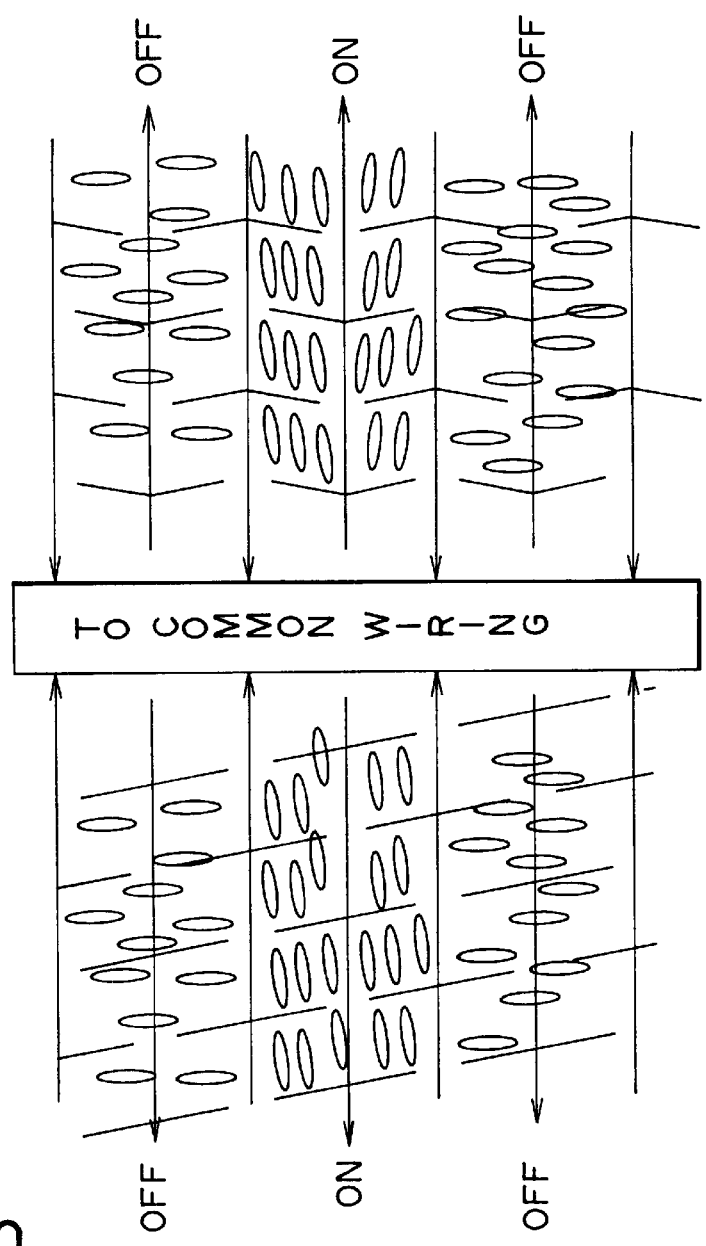

A light illumination apparatus according to Embodiment 3 is shown in FIGS. 4A and 4B. FIG. 4A is a sectional view, and FIG. 4B shows two patterns of concrete examples of the constitution of a transparent electrode forming stripes.

The constitution of the light illumination apparatus of FIG. 4 differs from that of Embodiment 2 only in the driving of liquid crystal (and attendant necessary constitution such as electrode structure). While the light illumination apparatus of Embodiment 2 uses a twist nematic type driving, the light illumination apparatus of Embodiment 3 uses the so-called IPS (In-Plane Switching), i.e. switching in the same plane. In Embodiment 3, like in Embodiment 2, refraction and scattering arising from the refractive index difference between the rugged pattern 25 and the liquid crystal layer are utilized. Specific constitution and effects thereof will be described below.

In the light illumination apparatus of FIG. 4A, rubbing treatment is so made that the orientation vector of the liquid crystal layer is parallel with the roughly propagating direction of light (direction perpendicular to the axis of lamp) in an electric field non-applied condition, and electrodes are so arranged that the orientation vector is substantially parallel with the lamp axis in a field applied condition.

In FIG. 4A, the orientation of the liquid crystal layer in the field applied condition is substantially the same as the orientation of the liquid crystal layer in a field non-applied condition in Embodiment 2, and light is scattered and emitted to the upper side of the light illumination apparatus.

On the other hand, the liquid crystal layer in the field non-applied condition in FIG. 4A is oriented in roughly the propagation direction of light; therefore, the refractive indices of the liquid crystal layer and the rugged pattern 25 for S polarized light component are both 1.49 and, ideally, do not affect the conditions for totally internal reflection. As for P polarized light component, the two refractive indices components are different, strictly speaking; however, in consideration of the partial distribution of the angle of incidence of light in between about 48° and 90°, Δn is regulated to be 0.2, whereby the refractive index difference between the rugged pattern 25 and the liquid crystal layer is decreased, and the conditions for totally internal reflection are maintained. Therefore, light is transmitted through the regions in the field non-applied condition until it reaches the region in the field applied condition. The effects of the second reflector 17 and of the phase difference plate 19 disposed on entire surface of the second reflector 17 are the same as in Embodiment 2.

Next, FIG. 4B is a schematic view of two exemplary arrangements of electrodes for generating an electric field to be applied to a liquid crystal, as viewed from the upper side of the light illumination apparatus.

In either of FIG. 4B, branch electrode portions are disposed nearly perpendicular to main electrode lines, and a plurality of branch electrode portions are mingled. When a voltage is applied to an arbitrary main electrode line, electric field is generated between the arbitrary main electrode line and other main electrode lines on both sides, and the orientation of the liquid crystal is changed, resulting in a light scattering condition. In order to generate an electric field, a voltage difference must be provided between one main electrode line and adjacent main electrode line; therefore, it is useful to apply electric field every one electrode line and make the main electrode lines at both ends be common electrode. In this case, the region between the main electrode lines functioning as common electrode corresponds to the stripe region described above in Embodiment 2. As for material, the electrode wiring may be transparent electrode or metallic electrode.

While the scattering condition is obtained when an electric field is applied in Embodiment 3, it is possible to obtain a transmissive condition at the time of application of electric field by changing the rubbing treatment direction by 90°. Naturally, a liquid crystal with a negative birefringence may be used. Where the scattering condition is obtained by application of electric field, there is a merit that the scattering condition is not affected by disturbances in the electric field arising from arrangement of electrodes.

Embodiment 4

A sectional view of a light illumination apparatus according to Embodiment 4 is shown in FIG. 5.

In Embodiment 4, in order to enhance luminance of light emission, light sources 10A, 10B are disposed on both sides of a light-pipe 12, and lamp covers 11A, 11B are disposed therearound. Other arrangements are substantially the same as in Embodiment 1.

Incident light 120 coming from the light source 10A is propagated through the light illumination apparatus while repeating totally internal reflection at the interface between the light-pipe 12 and an air layer 18 where a light scattering control layer 20 is in a transmissive condition 210. The totally internally reflected light 122 is scattered upon entering the light scattering control layer 20 in the scattering condition 211. The light component with an angle of incidence less than $\sin^{-1}(1/n)$, namely, emitted light 124 is emitted, to be emitted light 125 which is emitted to the exterior of the light illumination apparatus. Scattered light 123 toward the lower side of the light illumination apparatus is reflected upwards by a reflector 16, to be emitted light. Light emitted from the light source 10B can be selectively emitted from predetermined regions by the same principle.

Since the lamps are disposed on both sides of the light-pipe in this embodiment, there is a merit that in-plane uniformity is better than that in Embodiment 3. While an example of light scattering control layer 20 independent from polarization as in Embodiment 1 is mentioned, a polarized light scattering control layer dependent on polarization as in Embodiment 2 can naturally be applied.

In Embodiment 4 also, movement of the light emissive region 200 as in FIG. 2 can be carried out without need to excessively increase the number of the light sources 10 disposed on lateral sides of the light-pipe, and the emissive region can be scanned by controlling the light scattering control layer 20B while the light source is constantly kept ON. Further, for example, where display is carried out by turning ON for ¼ of one period, brightness must be 4 fold in order to obtain the same brightness sensation. In the light illumination apparatus of Embodiment 4, the area of the light emissive region 200 is ¼ of the total area, whereby light is concentrated, and the brightness during the ON period can be 4 fold as compared with the case where all areas are transmissive. As a result, the brightness sensed as an average by the observer can be made to be the same as that in the case where all areas are ON.

Embodiment 5

Figure 6:
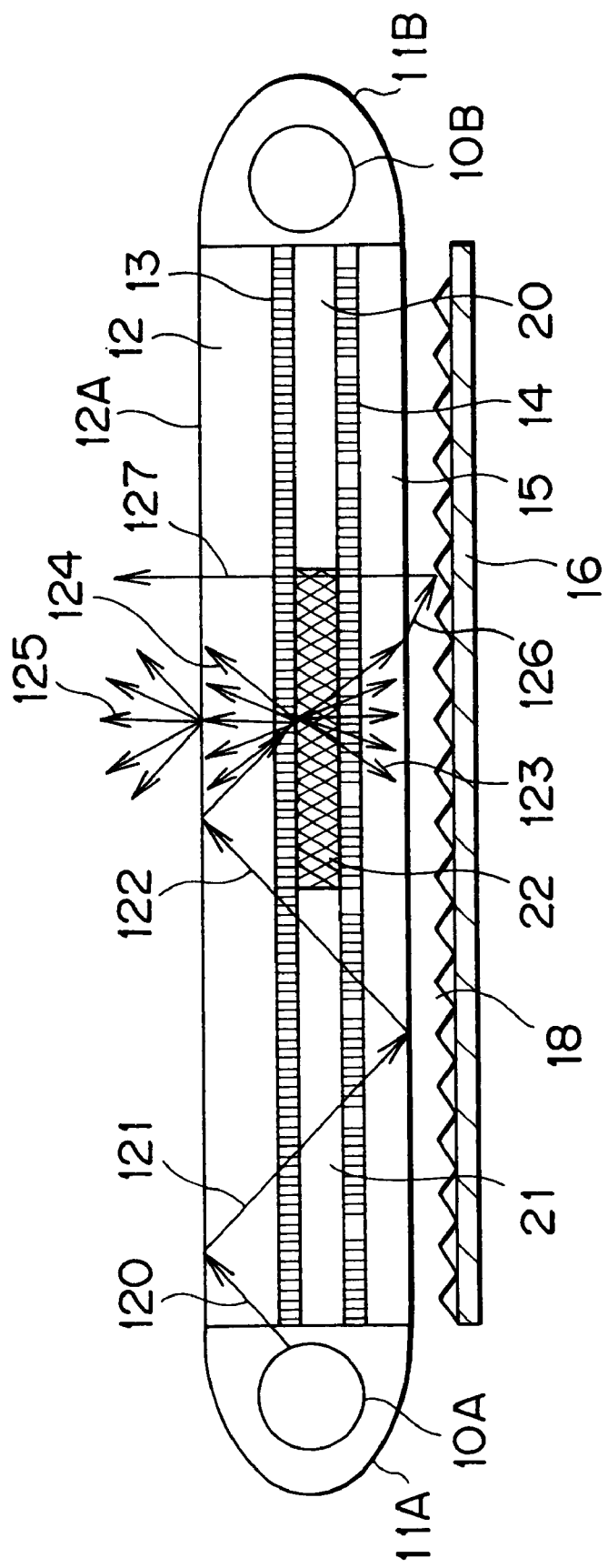
FIG. 6 is a view illustrating the constitution of a light illumination apparatus according to the 5th named invention.

A sectional view of a light illumination apparatus according to Embodiment 5 is shown in FIG. 6.

Embodiment 5 differs from Embodiment 4 in that the reflector 16 has triangular stripes extending perpendicularly to the surface of the drawing at an upper portion of the reflector. As a result, scattered light 123 emitted from a light emissive region to the side of the reflector is mostly refleted by the reflector 16 in the normal direction, leading to enhancement of emission efficiency. In Embodiment 5 also, a polarized light scattering control layer dependent on polarization as in Embodiment 2 can be applied as the light scattering control layer 20.

In Embodiment 5 also, movement of the light emissive region 200 as shown in FIG. 2 can be carried out without need to excessively increase the number of light sources 10 disposed on lateral sides of the light-pipe, and emissive region can be scanned by controlling the light scattering control layer 20B while keeping the light source ON. Further, where display is carried out by turning ON for ⅛ of one period, brightness must be 8 fold in order to obtain the same brightness sensation. In the light illumination apparatus according to Embodiment 5, the area of the light emissive region 200 is ⅛ of the total area, whereby light is concentrated, and the brightness in ON period can be made to be 8 fold as compared with that in the case where all areas are transmissive. As a result, the brightness sensed as an average by the observer can be made to be the same as in the case where all areas are ON.

Embodiment 6

FIG. 7 is a perspective view of a release type hologram diffuser applicable to the rugged pattern 25 of Embodiments 1 to 4. Here, Embodiment 1 will be described as an example. As has been described above, where only the PDLC as the light scattering control layer 20A is provided, a roughly anisotropic scattering occurs, and much light undergoes totally internal reflection at an emission interface, which is a problem from the viewpoint of directivity of light. Namely, even where light scattering property is provided, if the scattered light is not directed to the normal to an emission plane, the light components with an angle of incidence on the interface of greater than $\sin^{-1}$ (1/n) undergo totally internal reflection, so that efficient emission of light cannot be attained. Thus, in Embodiment 6, a release type hologram with a pitch of 0.4 to 1 μm, exclusive, and an inclination angle 51 of about 35° was used as the rugged pattern 25. The light propagated through the light-pipe with a refractive index n=1.49 is about 48° to 90° relative to the normal to the emission plane, and the light incident on the hologram 25 at this angle of incidence can be diffracted into the direction normal to the emission plane in visible region, whereby directivity of light and light utility efficiency can be enhanced.

In order to enhance directivity of light, a refractive index modulation type liquid crystal hologram device disclosed in Monthly FPD Intelligence 2000.3 p.76 can be used.

Thus, by directing the scattered light to the direction normal to the emission plane, emission efficiency can be drastically enhanced.

Embodiment 7

Figure 8:
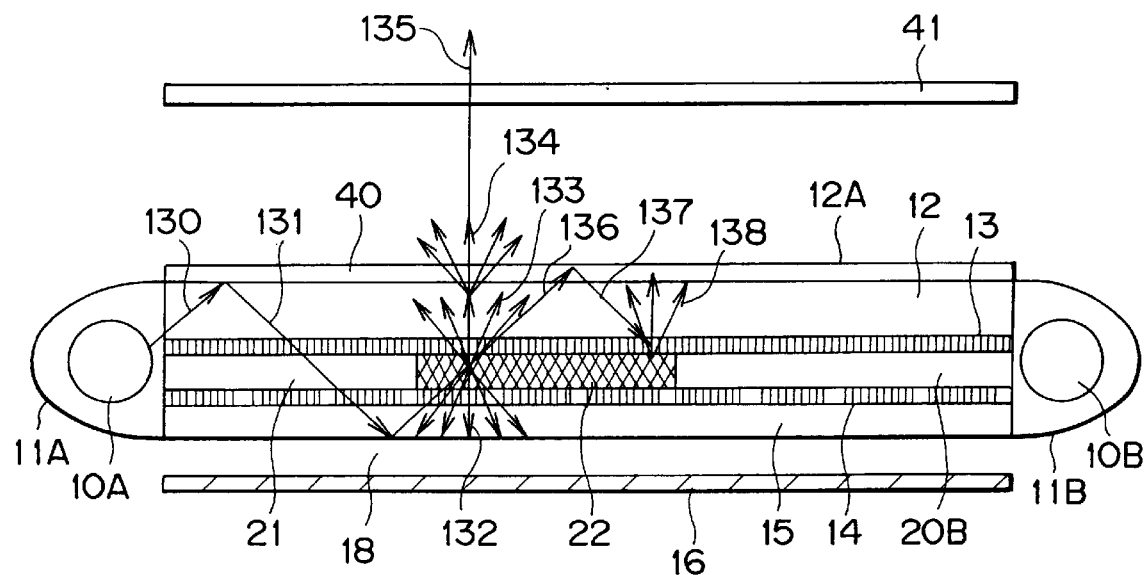
FIG. 8 is a view illustrating the constitution of a light illumination apparatus of Embodiment 7.

A sectional view of a light illumination apparatus according to Embodiment 7 is shown in FIG. 8. The light illumination apparatus of Embodiment 7 is substantially the same as that used in Embodiment 2, and differs from Embodiment 2 in that lamps are disposed on both sides of the light-pipe, a phase difference plate 40 functioning as a ¼ wavelength plate is disposed on the emission side of the light-pipe 12, and a phase difference plate 41 functioning as a ¼ wavelength plate is disposed above the phase difference plate 40 with an air layer therebetween.

Incident light 130 being nonpolarized light incident on a transmissive region 21 where a polarized light scattering control layer 20B is in a transmissive (voltage applied) condition repeats totally internal reflection inside the light illumination apparatus, as has been described in Embodiment 2, and is incident on a scattering region 22 where the polarized light scattering control layer 20B is in a scattering (voltage non-applied) condition. In the scattering region 22, liquid crystal molecules are oriented in the direction perpendicular to the surface of the drawing, so that the refractive indices of liquid crystal and a rugged pattern 25 are equal for P polarized light (polarized light parallel to the plane of incidence) but are different for S polarized light (polarized light perpendicular to the plane of incidence). Of the incident light 131 being nonpolarized light incident on the scattering region 22, the S polarized light component is scattered to be emitted S polarized light 133, which is converted into circularly polarized light 134 by the phase difference plate 40, and is further converted into linearly polarized light 135 by the phase difference plate 41, before being emitted. On the other hand, the P polarized light component 136 is propagated by undergoing totally internal reflection even in the scattering region 22, and is reflected at the interface of the phase difference plate 40 and air, namely, it passes through the phase difference plate 40, so that it is converted into S polarized light 137 by the phase difference plate 40. The thus converted S polarized light is again incident on the liquid crystal layer being the scattering region 22, to become emitted S polarized light 138, and becomes linearly polarized light the same with the linearly polarized light 135, before being emitted from the phase difference plate 41, in the same manner as above. While the P polarized light is converted into S polarized light in the scattering region, the number of times of reflection of the P polarized light depends on the thickness of the light illumination apparatus and the width of the scattering region (for example, left-right direction on the surface of FIG. 8), and can be optimized in designing.

Thus, nonpolarized light is converted into polarized light, and the light can be emitted from selective positions. When it is applied to a display apparatus utilizing polarized light, light utility efficiency can be enhanced.

In Embodiment 7 also, movement of light emissive regions 200 as in FIG. 2 can be carried out without need to increase the number of light sources 10 disposed on lateral sides of the light-pipes, and scanning of emissive regions can be carried out by controlling the light scattering control layer 20B while keeping the light source ON. Further, for example, where display is performed by turning ON for ¼ of one period, brightness must be 4 fold so as to give the same brightness sensation; in the light illumination apparatus of Embodiment 7, the area of the light emissive regions 200 is ⅛ of the total area, and light is concentrated, so that brightness in the ON period can be made to be 4 times that in the case where all areas are transmissive. As a result, the brightness sensed as an average by the observer can be made to be the same as in the case where all areas are ON.

Embodiment 8

Figure 9:
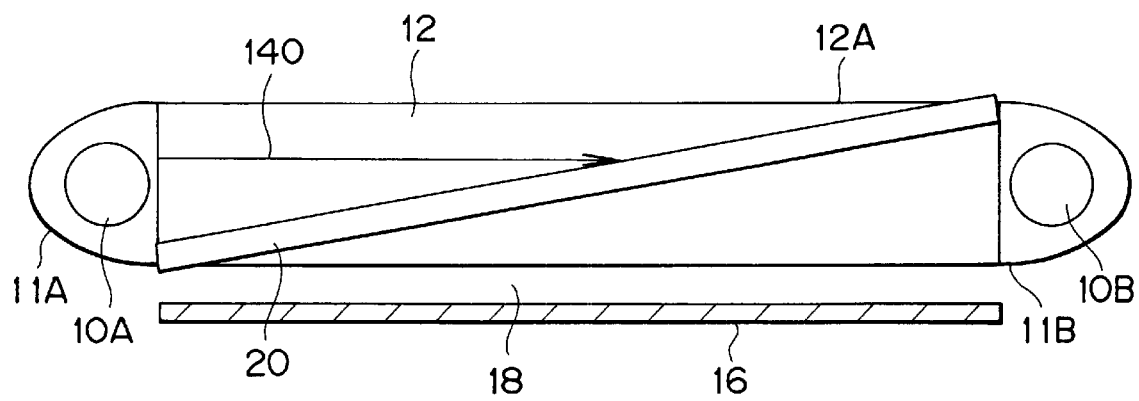
FIG. 9 is a view illustrating the constitution of a light illumination apparatus of Embodiment 8.

A sectional view of a light illumination apparatus according to Embodiment 8 is shown in FIG. 9.

In Embodiment 8, a light scattering control layer 20 is disposed slantly relative to the plane of the light illumination apparatus.

In Embodiment 1 to 7, of the light emitted from the light source 10, the component parallel to the plane of light-pipes, namely the incident light 140 on the light-pipe is reciprocated between the light source 10 and an opposed lamp or second reflector, and is absorbed, so that it cannot be utilized. As shown in FIG. 9, on the other hand, where the light scattering control layer 20 is disposed slantly relative to the plane of the pair of light-pipes, absorption loss of light components parallel to the emission plane can be prevented, and controlled efficiently. Namely, emission efficiency can be enhanced.

Embodiment 9

Figure 14:
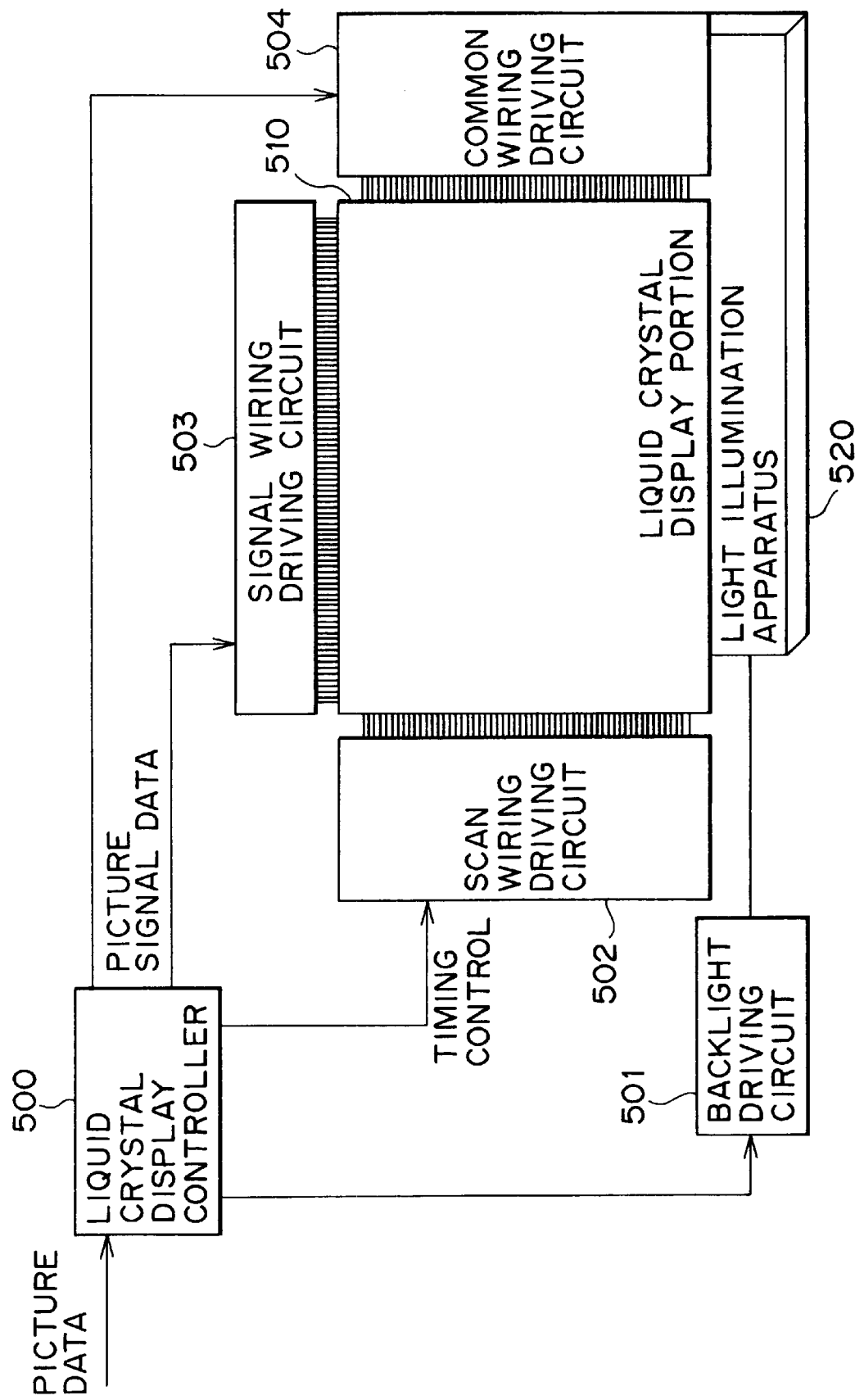
FIG. 14 is a diagram illustrating the liquid crystal display apparatus according to the present invention.

A liquid crystal display apparatus according to Embodiment 9 comprises, for example, as shown in FIG. 14, a light illumination apparatus of Embodiment 1 on the backside, and an active matrix type liquid crystal display device disposed on the light illumination apparatus. Any of the light illumination apparatuses of Embodiments 1 to 8 may be disposed on the backside. The point stressed in Embodiment 9 is the effects of a combination of the driving of the liquid crystal display device and the driving of the light illumination apparatus according to the invention. The use of the liquid crystal display apparatus according to the invention may be applied to television receivers, monitors, personal digital assistants and the like. In the case of the personal digital assistance, the reductions of thickness and size of the present light illumination apparatus promises enhanced handiness. In the case of the television receiver and monitor, not only reduction in thickness but also suppress of heat generation by reducing the number of light sources and reduction in weight of the apparatus as a whole can be contrived.

Although the active matrix type liquid crystal display device used in Embodiment 9 is not shown, it comprises a pair of transparent substrates, a polarizing plate provided on at least one of the pair of transparent substrates, a liquid crystal layer sandwiched between the pair of transparent substrates, scan wires and signal wires formed in matrix on one of the transparent substrates, active devices (thin film transistors) functioning as gate terminals provided at intersection points, pixel electrodes disposed correspondingly to the regions surrounded by the scan wiring and the signal wiring and connected to the signal wiring through the active devices, opposite electrodes provided on the other of the substrates, a scan wiring driving circuit for controlling gate voltage, a signal wiring driving circuit for controlling signal voltage, and a liquid crystal display controller for controlling the scan wiring driving circuit and the signal wiring driving circuit.

The liquid crystal display device controls the voltage on the pixel electrodes through the active devices, whereby the orientation of liquid crystal and attendant light transmissivity are regulated (polarization condition is regulated) and pictures are displayed. In Embodiment 9, the TN system is adopted, and white is displayed when electric field is applied. However, the principle of driving the liquid crystal is not limited to Embodiment 9, as far as the pictures are displayed by regulating the polarization condition and light transmission condition; for example, driving by IPS system can be adopted, and black can be displayed when electric field is applied.

Figure 11:
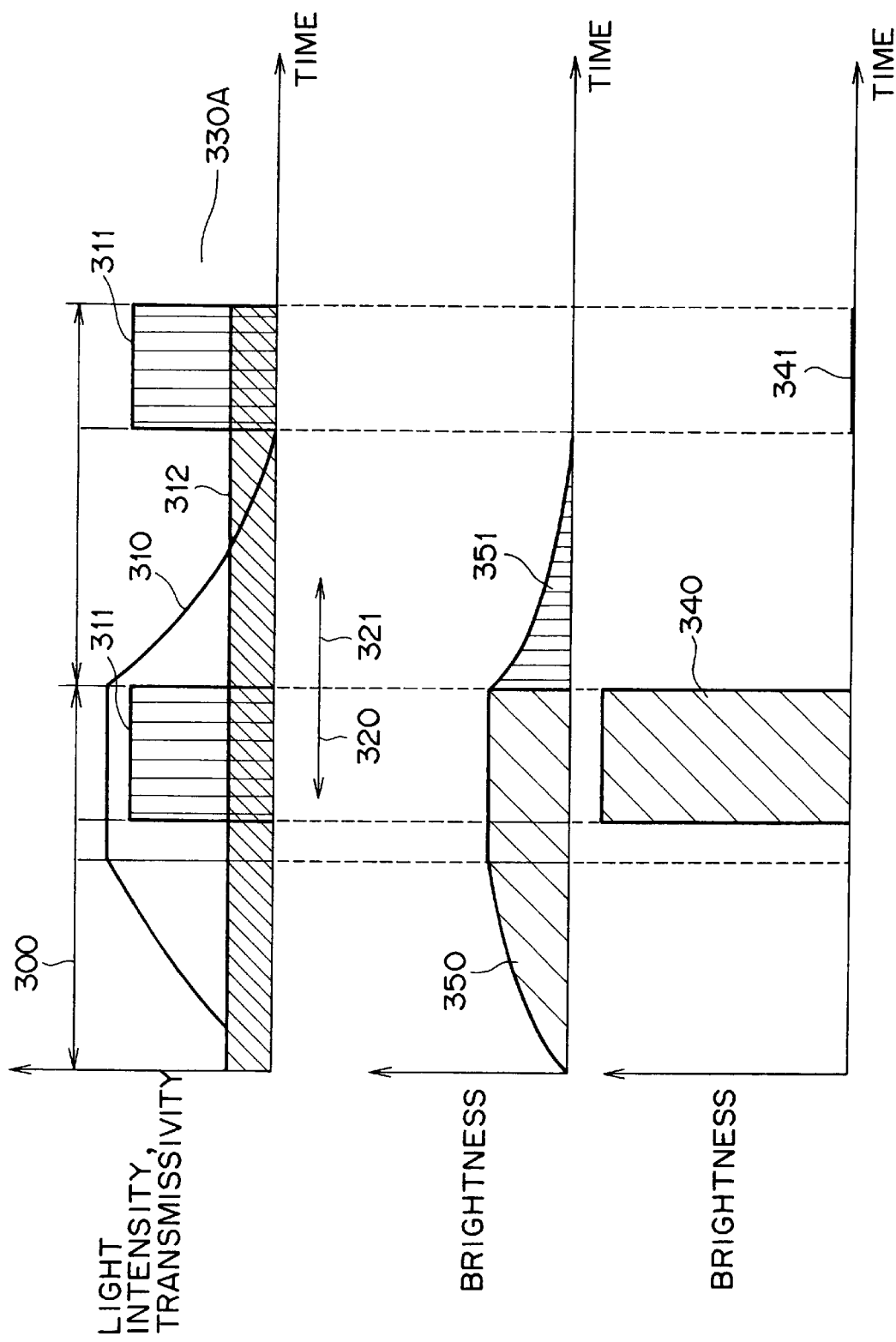
FIG. 11 is a diagram illustrating a liquid crystal display apparatus of Embodiment 9.

Significant points in this embodiment will be described referring to FIGS. 11 and 12. In FIG. 11, for simplification of explanation, response time of liquid crystal molecules in the light scattering control layer of the light illumination apparatus is assumed to be roughly 0 ms. Description in consideration of the actual response speed will later be given referring to FIG. 12.

Where the frame period (16.6 ms) in the liquid crystal display device is denoted by 300, and one frame period 320 is a field applied (white display) period while the other frame period 321 is a field non-applied period (black display), the transmissivity of pixel varies as shown by 310. As shown by 310, the response speed of the liquid crystal in Embodiment 9 is about ½ of the frame period 300 (about 8 ms).

In a conventional liquid crystal display apparatus not using a blink backlight, a backlight always turns a light source ON as indicated by line 312, while the backlight in Embodiment 9 turns the light source ON for only a predetermined period (synchronously with a scan signal, for example) as indicated by line 311.

Since the brightness of display is determined by the product of the transmissivity at pixel and the light intensity of backlight, in the conventional liquid crystal display apparatus, the brightness sensed by the observer in the frame period 320 is represented by the area of 350, and the brightness sensed in the frame period 321 is represented by the area of 351. Namely, a loss of brightness dependent on the leading edge of liquid crystal is generated at the time of white display, while leakage of light dependent on the trailing edge of liquid crystal is generated because a light source is always turned ON at the time of black display, resulting in a reduction of white-black contrast.

On the other hand, with the arrangement where light is emitted only for a predetermined period, use of the light illumination apparatus of the present invention enables a display without lowering of time average brightness and contrast. As has been described in Embodiments 1 to 7, with the arrangement where light is projected only for ⅟k of one frame period, the light intensity can be made to be k fold by controlling the emission area, whereby the brightness sensed by the observer in one frame period can be made constant. Numerals 340 and 341 are waveforms indicating the brightness sensed by the observer in the case of the liquid crystal display apparatus according to Embodiment 9. The brightness 340 of this white display is greater than the above-mentioned brightness 350 in the white display frame period 320, and the leakage of light in the black display frame period 321 is substantially absent as indicated by the brightness 341 of black display. Namely, a contrast ratio higher than that of a prior-art light source can be obtained, and this can be applied to a liquid crystal display device using a liquid crystal with slower response, in other words, a liquid crystal display device with shorter frame period relative to the response of liquid crystal (particularly, a display device adapted for motion picture display). The contrast ratio herein can be given as the quotient of the brightness of white display and the brightness of black display.

Next, the effects of the liquid crystal display apparatus of Embodiment 9 in consideration of actual response time of liquid crystal in the light illumination apparatus will be described referring to FIG. 12. Other points than the consideration of the response speed of the liquid crystal layer in the light illumination apparatus are the same as those of the liquid crystal display apparatus of FIG. 11.

In the same manner as above, the brightness of white display of the liquid crystal display apparatus in Embodiment 9 is given by the area of 340, and the brightness of black display is given by the area of 341. The contrast ratio is greater than the contrast ratio (quotient of 350 and 351) in the conventional liquid crystal display apparatus. Naturally, as above-mentioned, since light can be concentrated by selecting time and position before input to the liquid crystal display apparatus, lowering of brightness can be obviated.

Figure 12:
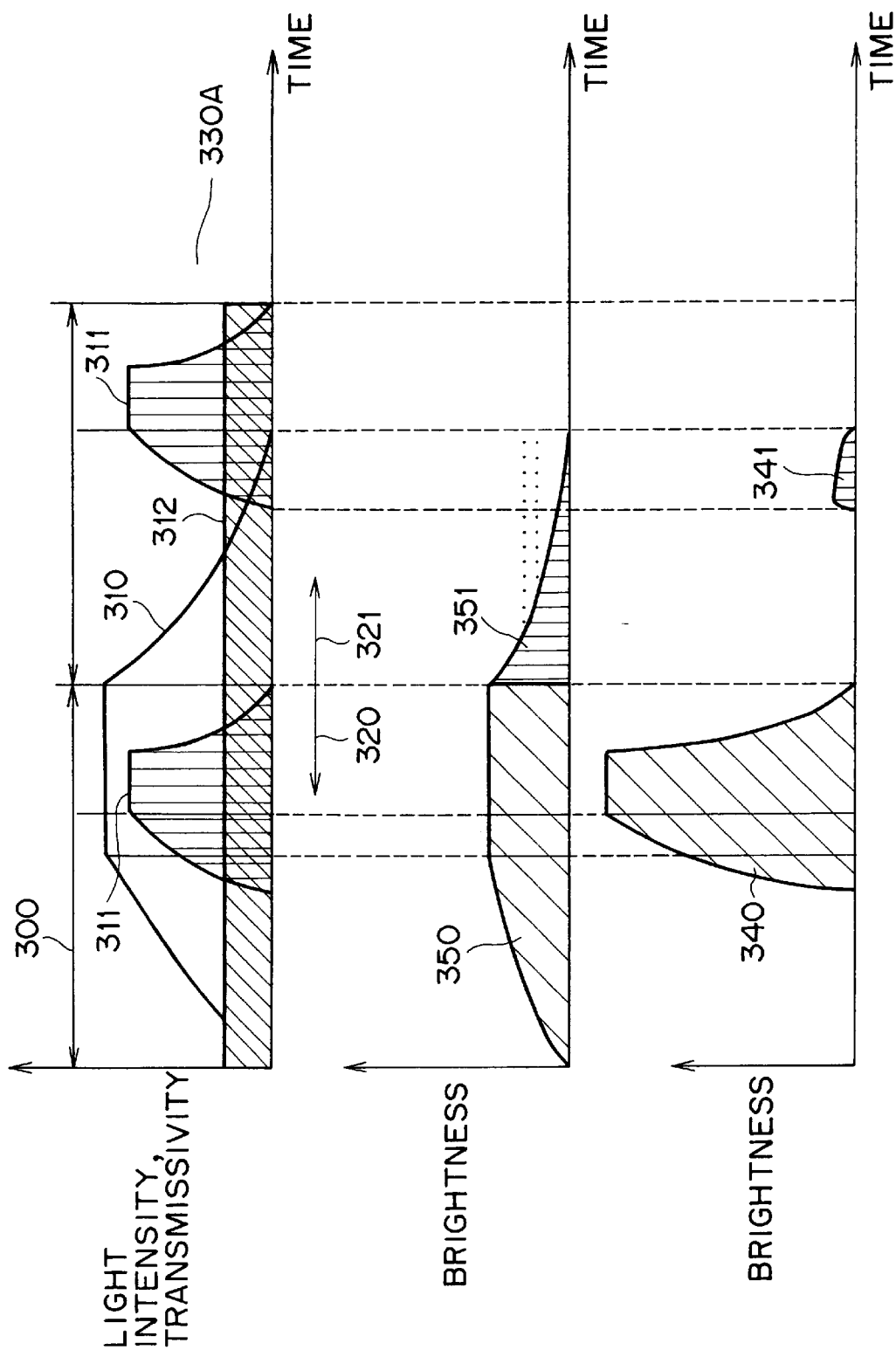
FIG. 12 is a diagram illustrating the liquid crystal display apparatus of Embodiment 9.

In FIG. 12, in consideration of response speed of the light illumination apparatus, the timing of non-application of electric field onto the liquid crystal in the light illumination apparatus is advanced by the length of time from the start of black display period to completion of response. This is particularly effective for obviating leakage of light at the time of black display. With the illumination time advanced by an amount corresponding to the response speed of the trailing edge of liquid crystal in the light illumination apparatus, brightness corresponding to the product (overlap) of the transmissivity due to the trailing edge of liquid crystal in the light illumination device and the light intensity due to the leading edge of liquid crystal in the liquid crystal display apparatus may be observed (corresponding to the area of 341). Where an overlap is generated, it is effective to determine the timing of non-application of electric field to liquid crystal in the light illumination apparatus in comparative consideration of the area of overlap (brightness) of profiles of responses of liquid crystal.

Thus, in the liquid crystal display apparatus in Embodiment 9, the light illumination apparatus moves the light emission region synchronously with a scan signal for the liquid crystal display device, and performs illumination for a predetermined period of time, whereby deterioration of motion picture quality due to the hold type can be restrained. This is sufficiently applicable to a liquid crystal display device using a liquid crystal with slow response, in other words, a liquid crystal display device with a shorter frame period relative to the response of liquid crystal (particularly, display device adapted for display of motion pictures), and a sharp display of motion pictures can be obtained. In addition, display of high picture quality with high contrast ratio can be obtained.

Embodiment 10

Figure 13:
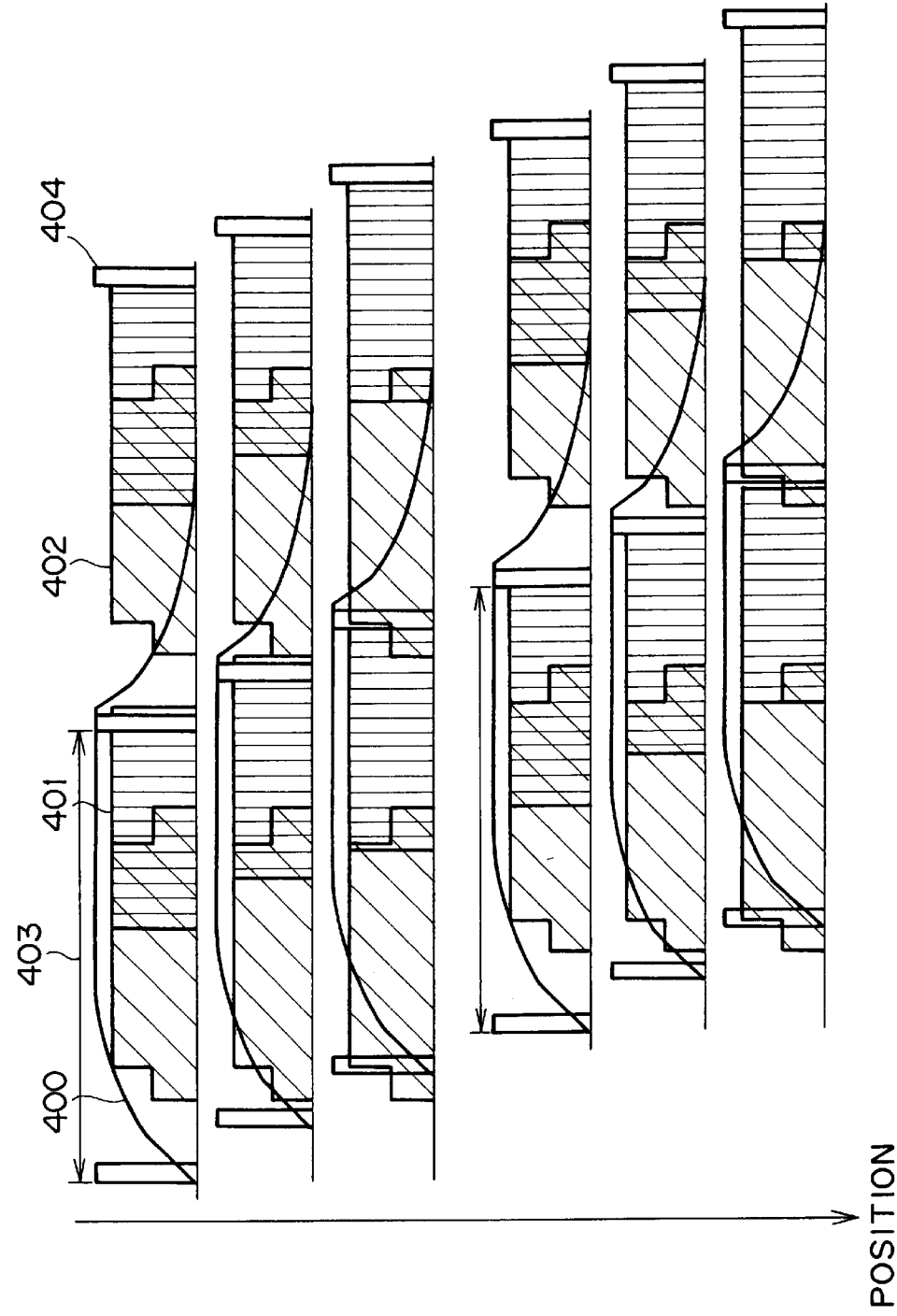
FIG. 13 is a diagram illustrating the liquid crystal display apparatus of Embodiment 10.

FIG. 13 shows the effects of a liquid crystal display apparatus. The axis of abscissas represents time, and the axis of ordinates represents the position (scan direction) in the liquid crystal display apparatus. Numeral 400 denotes the response of liquid crystal (change in transmissivity) at each position and time.

The liquid crystal display apparatus of Embodiment 10, like that in Embodiment 9, comprises the light illumination apparatus of Embodiment 1 on the backside, and an active matrix type liquid crystal display device is disposed thereon. Like in Embodiment 9, any of the light illumination apparatuses of Embodiments 2 to 7 may also be used. For convenience of explanation, the response time of liquid crystal in the light illumination apparatus is assumed to be substantially 0 ms. The effects will be described referring to FIG. 13, in comparison with a prior-art example with a blink backlight.

In the liquid crystal display apparatus, a voltage is applied to a liquid crystal layer through a timing signal corresponding to each frame period 403 and a scan signal 404. The transmissivity of the liquid crystal layer is modulated according to the voltage applied, and a synchronous light emission region of the light illumination apparatus is scanned with time as denoted by 401. Numeral 402 denotes a waveform of scan of light emission region by a backlight of a conventional directly-below system wherein lamps are arranged.

FIG. 13 shows liquid crystal response and backlight emission characteristics in pixels on every 30 scan lines. Namely, of the six profiles shown in FIG. 13, the top one represents the change of transmissivity in a pixel on the first scan line, and the bottom one represents the change of transmissivity in a pixel on the 151st scan line. The pixels with the profiles shown in FIG. 13 are assumed to be on the same signal line.

In the backlight on the conventional directly-below system wherein lamps are arranged, the numbers of lamps and inverters are increased, and divisions finer than the lamp diameter cannot be realized. Therefore, even if the liquid crystal display device changes the scan position, the light emission position of the light illumination apparatus must be the same position for a certain period of time (several frame periods). More specifically, the position of the emission characteristics 402 in FIG. 13 must be the same for the upper three profiles. As a result, since the relationship between the liquid crystal response (transmissivity change) 400 and backlight luminance 402 differs profile to profile, the brightness given by the product of the liquid crystal response (transmissivity change) 400 and the backlight luminance 402 varies in the line direction (up-down direction in the figure) even if the transmissivity curves are the same; thus, nonuniformity of brightness is generated.

On the other hand, in the light illumination apparatus of Embodiment 13, transparent electrodes are arranged in the form of stripes, so that divisions finer than the lamp diameter can be designed. As a result, the light emission regions of backlight can be scanned more finely than the prior art. An example of the finest scan in FIG. 13 is the scan with the width of a plurality of vertical lines (corresponding to electrode width) present within the region surrounded by 401. Therefore, the problem of nonuniformity of brightness in the prior art can be solved, and it is possible to obtain a display apparatus capable of displaying high picture quality without nonuniformity of brightness. This is particularly effective for the case where response speed of liquid crystal is slow relative to driving frequency.

As has been described, it is possible by the constitution of the present invention to regulate the width of the light emission region, thereby enhancing the light concentration, and to obtain a light intensity greater than that of lamp. By combination of these effects, it is possible to contrive optimization of scan in the light illumination apparatus.

For convenience of explanation, the same light emission position was assumed to be every 90 scan lines in the prior art and every 30 scan lines in the present invention. It is not at all necessary to control the light emission region of backlight every 30 scan lines, and optimization can be contrived in consideration of the change in transmissivity every scan line. For example, control of light emission region every 50 scan lines (about 15 mm) could be made without inducing nonuniformity of brightness.

Embodiment 11

Figure 15:
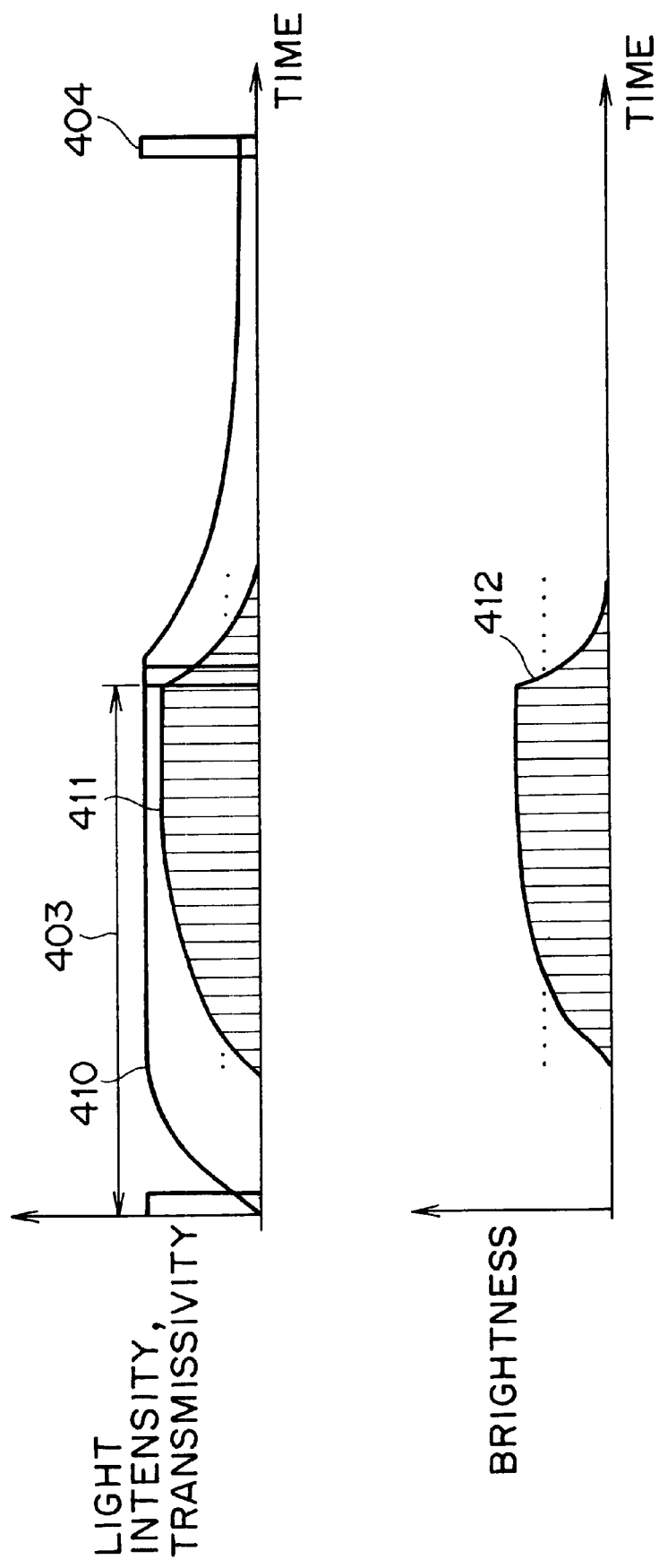
FIG. 15 is a diagram illustrating a liquid crystal display apparatus of Embodiment 11.

The effects of the liquid crystal display apparatus according to the present invention will be described referring to FIG. 15. The liquid crystal display apparatus of the present embodiment, like in Embodiment 9, comprises a light illumination apparatus of Embodiment 1 on the backside, and an active matrix type liquid crystal display device is arranged thereon. Light emission regions of backlight are selected synchronously with the timing of drive of the liquid crystal display device. By moving the emission region of the light illumination apparatus synchronously with a scan signal and illuminating for a predetermined period of time, deterioration of motion picture quality due to the hold type can be suppressed, and sharp motion pictures can be obtained. Like in Embodiment 9, any of the light illumination apparatuses of Embodiments 2 to 7 can also be used. As the liquid crystal display device, there was adopted a normally closed display mode, namely, a display mode wherein black is displayed in a voltage non-applied condition and white is displayed in a voltage applied condition. While a liquid crystal display device of the transverse electric field system was used in this embodiment, it is not limitative.

Where the frame period (16.6 ms) is denoted by 403, the response (transmissivity) of liquid crystal of a pixel in the display device at the moment of shifting from white display period to black display period varies as indicated by 410. Namely, the liquid crystal molecules of the liquid crystal display device respond faster when a voltage is applied than when a voltage is interrupted (when a voltage is non-applied). The response at the time of application of a voltage can be further accelerated by raising the voltage applied.

On the other hand, the light illumination apparatus of Embodiment 11 is in the so-called normally scattering condition wherein a voltage non-applied portion is in a light emissive condition and a voltage applied portion is in a light non-emissive condition. The response (brightness) of backlight luminance in the light illumination apparatus indicated by 411 was as high speed as about 4 ms when a voltage was applied and about 8 ms when a voltage is interrupted. With the voltage further raised, high-speed response of about 2 ms was realized, and light could be interrupted.

As described above, the brightness 412 is given as the product of the response 410 of the liquid crystal display device and the backlight luminance 411 of the light illumination apparatus. Therefore, by the above arrangement, the direction of faster response of the liquid crystal display device and the direction of slower response of the light illumination apparatus are combined, whereby a sharp leading edge can be obtained in the profile of brightness, while the direction of slower response of the liquid crystal display device and the direction of faster response of the light illumination apparatus are combined, whereby a sharp trailing edge can be obtained. Thus, sharp motion picture quality with high contrast ratio can be obtained.

While a combination of a normally closed mode and a normally scattering mode was used in Embodiment 11, the combination is not limited to this combination, as far as the above-mentioned significant point is utilized.

Embodiment 12

Figure 16:
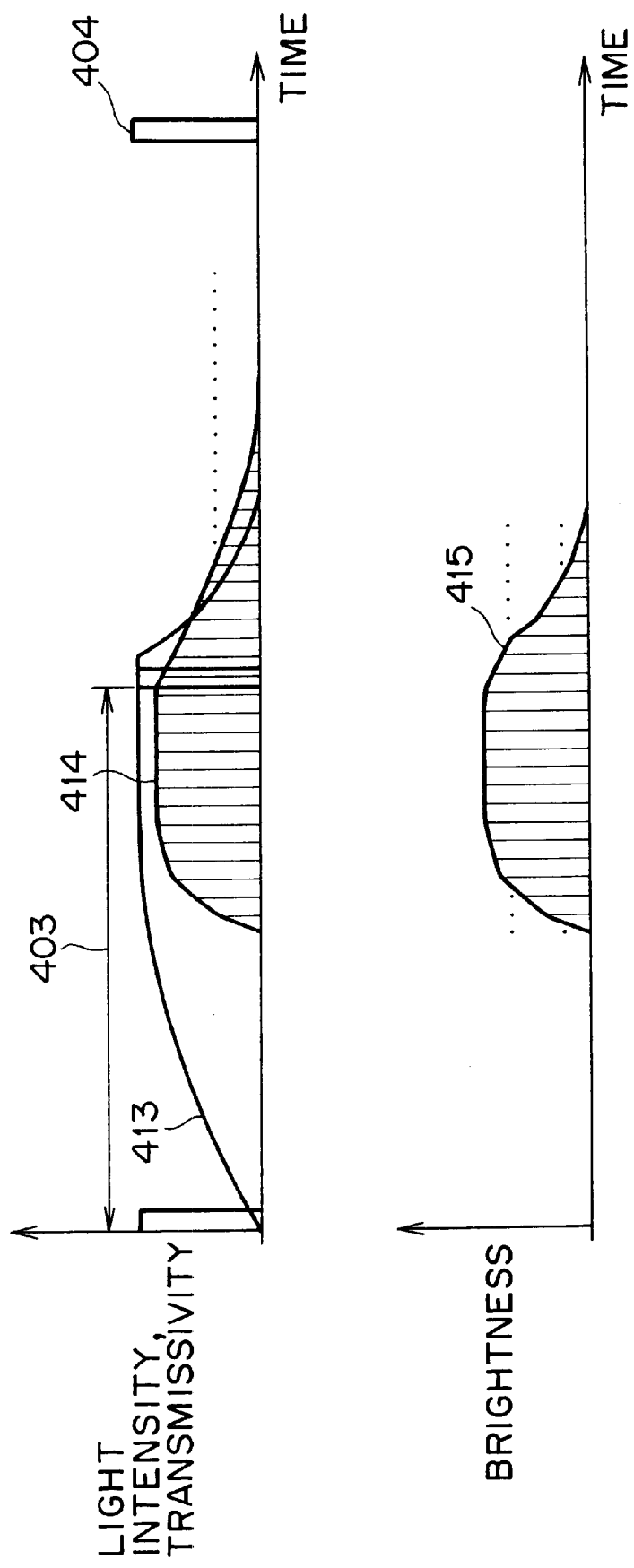
FIG. 16 is a diagram illustrating a liquid crystal display apparatus of Embodiment 12.

The effects of a liquid crystal display apparatus of Embodiment 12 will be described referring to FIG. 16. Basic structure of this embodiment is the same as that of the liquid crystal display device of Embodiment 11. This embodiment differs from Embodiment 11 in that, for the liquid crystal display device, a normally open display mode was adopted wherein a voltage non-applied condition corresponds to white display and a voltage applied condition corresponds to black display, and, for the light illumination apparatus, a normally transmissive mode was adopted wherein a voltage non-applied condition corresponds to a light non-emissive condition and a voltage applied condition corresponds to a light emissive condition. While the display device uses a twisted nematic liquid crystal in Embodiment 12, this is not limitative, as far as the normal open mode is realized. In order to provide the normally transmissive condition in the light illumination apparatus, a PDLC using a negative liquid crystal or an initially perpendicularly oriented liquid crystal using a negative liquid crystal was used in the light illumination apparatus of Embodiment 1. This can be applied in the same manner to Embodiments 2 to 7, as far as the normally transmissive condition can be realized.

By this arrangement, with frame period (16.6 ms) denoted by 403, the response (transmissivity) of pixel at the time of shifting from a white display period to a black display period varies as indicated by 413. Namely, the liquid crystal molecules of the liquid crystal display device respond faster when a voltage is applied than when a voltage is interrupted (electric field is non-applied). The response at the time of application of a voltage can be accelerated by raising the voltage applied. The light illumination apparatus is so designed that a voltage non-applied portion is in the light non-emissive condition and a voltage applied portion is in the light emissive condition; therefore, as indicated by 414, the response (brightness) in the light illumination apparatus is as fast as about 4 ms when the voltage is applied, and is 7 ms when the voltage is interrupted. A further faster response up to 2 ms can be realized, and light can be emitted, by raising the voltage.

As described above, the brightness 415 can be obtained as the product of the response 413 of liquid crystal in the liquid crystal display device and the backlight luminance 414 in the light illumination apparatus. Therefore, with the above arrangement, a steep leading edge in the profile of brightness can be obtained by combining the direction of faster response of the liquid crystal display device and the direction of slower response of the light illumination apparatus, and a steep tailing edge can be obtained by combining the direction of slower response of the liquid crystal display device with the direction of faster response of the light illumination apparatus. Thus, a sharp motion picture quality with high contrast ratio can be obtained.

While the combination of normally open mode and normally transmissive mode was used in Embodiment 12, combination is not limited to this combination, as far as the above-mentioned point is utilized.

Embodiment 13

Figure 17:
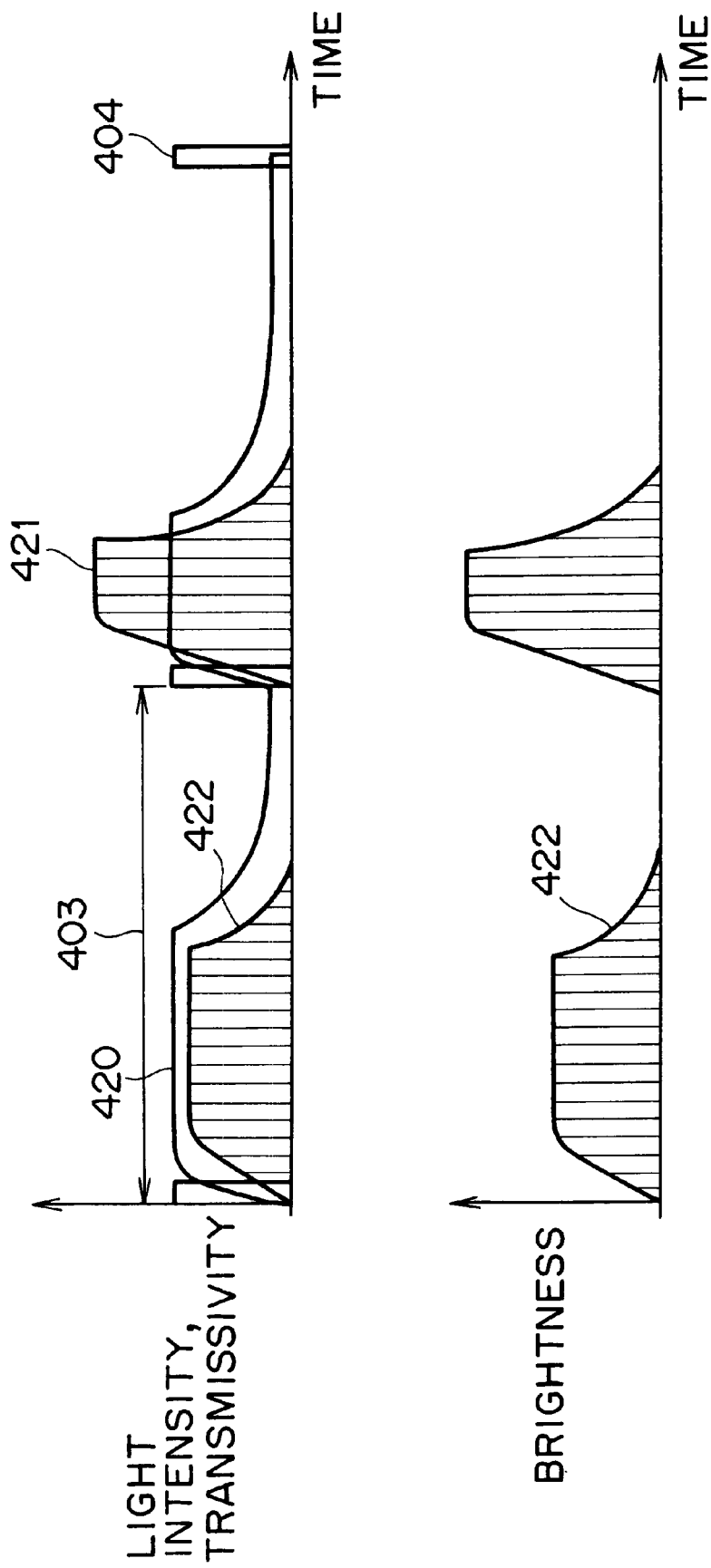
FIG. 17 is a diagram illustrating a liquid crystal display apparatus of Embodiment 13.

The effects of a liquid crystal display apparatus according to Embodiment 13 will be described referring to FIG. 17. Embodiment 13 differs from Embodiment 11 in that the liquid crystal display device is so designed as to provide a black display period in one frame period, namely, so-called black writing is carried out in one frame period. In addition, a light illumination apparatus in the liquid crystal display apparatus is that of Embodiment 1, and is a normally scattering type light illumination apparatus. As indicated by 421, the brightness responds as fast as about 4 ms when a voltage is applied, and responds in 8 ms when a voltage is interrupted. By raising the voltage applied, the response time can be shortened to about 2 ms and light can be interrupted. Naturally, the light illumination apparatuses of Embodiments 2 to 7 can also be used, as far as the effects of Embodiment 13 are displayed.

Before describing the effects of combination with the light illumination apparatus of the present invention, an outline of the liquid crystal display apparatus will be briefly described. A specific constitution example of a liquid crystal display device performing black writing is detailed in Japanese Patent Application No. 2000-81721.

The liquid crystal display device is capable of performing white display and black display in one frame period (so-called black writing), and the timing of the black writing can be varied every frame period. For example, in the left (first) frame period, black is written (voltage is non-applied) at half position of one frame period, whereas in the right (next) frame period, black is written at a quarter position of the frame period. This is a particularly effective means for obtaining a liquid crystal display apparatus adapted for high-speed high-quality motion picture display. For the liquid crystal display device, so-called normally closed display mode, namely, black display in a voltage non-applied condition and white display in a voltage applied condition, is adopted. Further, a liquid crystal display device of a transverse electric field system is used, but the system is not limitative as far as the above-mentioned display mode is realized. Herein only a change in transmissivity of the liquid crystal display device is also expressed as picture display.

However, when this liquid crystal display device is used, there is a problem to be solved, as follows. The brightness of light sensed by the observer is determined according to the product of transmissivity of pixels in a liquid crystal display device and light intensity of a light illumination apparatus in a liquid crystal display apparatus, and display time. Therefore, if the light intensity of the light illumination device is constant, the white display period will be ½, ¼ and ⅛, and accordingly the brightness sensed by the observer may become ½, ¼ and ⅛. Thus, realization of a light illumination apparatus capable of changing light intensity according to time has been desired.

The liquid crystal display apparatus using the light illumination apparatus according to the present invention solves the above problem by an emission method as follows. The effects of Embodiment 13 will be described.

The light illumination apparatus of Embodiment 13 comprises n (n is an integer) transparent electrodes arranged in the form of stripes, as has been described. Therefore, the light intensity in the case where m (m is an integer) transparent electrodes are in light emissive condition can be $m/n$ times the light intensity in the case where n transparent electrodes are all in the light emissive condition. Therefore, where the light intensity is increased to 2 times (4 times) the light intensity in the case of total area light emission when the picture display time, or white display period, is ½ (¼) of one frame period, the product of the transmissivity of pixels, the light intensity of the light illumination apparatus and the display period can be substantially constant, whereby the observer can sense a constant brightness independently of the display period of the liquid crystal display apparatus or the speed of motion picture. Referring to FIG. 17, the time of light illumination on the right side is one half of the time of illumination on the left side, but light intensity on the right side is two times that on the left side, so that the brightness sensed by the observer is constant. This cannot be realized without using the light illumination apparatus of the present application. In order to regulate the difference in brightness arising from minute differences in the response of liquid crystal, the intensity of light emitted from the light illumination apparatus can be raised to not less than 2 times.

Regulation of light intensity and scanning can be performed by using an organic EL in place of the liquid crystal layer, though there remain the problems of voltage control and electric power consumption.

In Embodiment 13 the white display period and black display period are variable, but the number of light emissive regions and time are regulated and selected according to the periods, whereby a constant brightness can be obtained. By using the light illumination apparatus according to the present invention capable of accurate scanning of light illumination regions and arbitrary control of light intensity, a liquid crystal display apparatus free of loss of light and nonuniformity of brightness and adapted to motion pictures can be obtained.

While the ratio of white display period is variable relative to the frame period in Embodiment 13, it may be fixed (for example, one half of frame period), and the time of black writing is not limited to that in Embodiment 13. Further, while the frame period is constant in Embodiment 13, variation of the frame period, namely, double-speed driving also generates the above-mentioned problem, so that such arrangement is applicable and the invention provides an effective means of solution.

The method of light emission as described above can be realized by providing the light illumination apparatus with a backlight driving circuit. The transparent electrodes constituting stripes are connected to the backlight driving circuit, which regulates the width of light emissive regions and illumination time and drives the light illumination apparatus according to instructions (for example, black write timing signal) from a liquid crystal display controller.

Like Embodiments 11, 12 and the like, the direction of faster response of the liquid crystal display device is combined with the direction of slower response of the light illumination apparatus, and the direction of slower response of the liquid crystal display device is combined with the direction of faster response of the light illumination apparatus. By this arrangement, as also shown in FIG. 15, the brightness 422 of white display given by the response 420 of liquid crystal in the liquid crystal display device and the backlight luminance 421 of the light illumination apparatus can have a steep leading edge and a steep trailing edge, whereby sharp motion picture quality can be obtained. In this meaning, the driving mode of the liquid crystal layer in the light illumination apparatus may be normally transmissive or normally scattering.

What is claimed is:

1. A light illumination apparatus adapted for illuminating a display device comprising:
    a pair of light-pipes; and
    a liquid crystal layer sandwiched between said pair of light-pipes; said light illumination apparatus further comprising:
        a first transparent electrode divided into a plurality of regions disposed on the side of one of said pair of light-pipes faced to said liquid crystal layer;
        a second transparent electrode disposed on the side of the other light-pipe faced to said liquid crystal layer;
        a light source disposed on a lateral side of at least one of said pair of light-pipes, with an air layer therebetween; and
        a first reflector disposed on the side of either one of said pair of light-pipes opposite to the side faced to said liquid crystal layer, with an air layer therebetween; wherein
            said light-pipe attended by said light source has a refractive index of not less than $\sqrt{2}$.

2. A light illumination apparatus as set forth in claim 1, further comprising a second reflector or second light source disposed on a lateral side of said light-pipe attended by said light source opposite to the lateral side on which said light source is disposed.

3. A light illumination apparatus as set forth in claim 1 or 2, wherein the surface of one of said pair of light-pipes is rugged.

4. A light illumination apparatus as set forth in claim 1, wherein said first transparent electrode is in the form of stripes.

5. A light illumination apparatus as set forth in claim 1 or 2, wherein said liquid crystal layer is a polymer dispersed liquid crystal (PDLC) layer.

6. A light illumination apparatus as set forth in claim 1 or 2, wherein said liquid crystal layer is a nematic liquid crystal layer.

7. A light illumination apparatus as set forth in claim 4, wherein said first transparent electrode in the form of stripes is composed of n transparent electrode stripes, said light illumination apparatus further comprises a backlight driving circuit for controlling an electric field impressed between said first transparent electrode and said second transparent electrode, said backlight driving circuit brings into a scattering condition the regions of said liquid crystal layer corresponding to m transparent electrode stripes (where m is an integer not less than 2, and $n \geq m$) of said first transparent electrode, and sequentially moves said scattering condition, and the period of time for which said liquid crystal layer corresponding to each of said n stripes of said first transparent electrode is in the scattering condition is $m/n$ of one frame period.

8. A light illumination apparatus as set forth in claim 7, wherein the value of m is maintained or changed every frame period.

* * * * *